United States Patent
Ramesh et al.

(10) Patent No.: US 12,380,519 B2
(45) Date of Patent: Aug. 5, 2025

(54) OPTIMAL COMMUNICATION ARCHITECTURE FOR SMART DISTRIBUTION POWER GRID

(71) Applicant: Amrita Vishwa Vidyapeetham, Tamil Nadu (IN)

(72) Inventors: Maneesha Vinodini Ramesh, Kerala (IN); Aryadevi Remanidevi Devidas, Kerala (IN); P. Venkat Rangan, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 77 days.

(21) Appl. No.: 18/121,483

(22) Filed: Mar. 14, 2023

(65) Prior Publication Data
US 2023/0419422 A1 Dec. 28, 2023

Related U.S. Application Data

(60) Division of application No. 17/474,764, filed on Sep. 14, 2021, now abandoned, which is a
(Continued)

(51) Int. Cl.
*G06Q 50/06* (2024.01)
*H04L 67/12* (2022.01)
(Continued)

(52) U.S. Cl.
CPC .............. *G06Q 50/06* (2013.01); *H04W 4/38* (2018.02); *H04W 12/12* (2013.01);
(Continued)

(58) Field of Classification Search
CPC ........ G06Q 50/06; H04W 4/38; H04W 12/12; H04W 12/125; G01R 19/2513;
(Continued)

(56) References Cited

U.S. PATENT DOCUMENTS

2013/0151177 A1* 6/2013 Hughes .................. G06F 17/10
702/60

FOREIGN PATENT DOCUMENTS

| CN | 106452920 A | * | 2/2017 | ......... H02J 13/0062 |
| CN | 105871724 B | * | 12/2018 | ............. H04L 41/12 |

OTHER PUBLICATIONS

Fateh et al., "Wireless Network Design for Transmission Line Monitoring in Smart Grid" IEEE Transactions on Smart Grid, vol. 4, No. 2, Jun. 2013 (Year: 2013).*

(Continued)

*Primary Examiner* — John C Kuan
(74) *Attorney, Agent, or Firm* — Donald R. Boys; Central Coast Patent Agengy LLC

(57) ABSTRACT

A method for implementing a micro grid within a Smart Distribution Power Grid (SDPG) has steps for connecting a smart meter enabled to sense voltage, to sense current and current direction and to communicate wirelessly to individual ones of consumer sites within an area of the micro grid, determining a set of Smart Distribution Nodes of a number, placement and data packet transfer technology to transfer data from the smart meters to a Micro Grid Controlling Station (MCS), the set determined in a manner to provide cost optimization, where cost is determined form at least original node costs, data packet hops, operating costs and maintenance costs, and implementing the set of SDNs along a power grid topology (PGT) of the micro grid, such that data is transmitted from each smart meter to a proximate SDN and through other SDNs to the MCS.

10 Claims, 28 Drawing Sheets

Related U.S. Application Data continuation-in-part of application No. 16/436,059, filed on Jun. 10, 2019, now Pat. No. 11,138,678, which is a continuation of application No. 14/719,786, filed on May 22, 2015, now Pat. No. 10,346,934.

(60) Provisional application No. 62/032,207, filed on Aug. 1, 2014.

(51) Int. Cl.
| | | |
|---|---|---|
| *H04W 4/38* | (2018.01) | |
| *H04W 12/12* | (2021.01) | |
| *H04W 12/125* | (2021.01) | |
| *G01R 19/25* | (2006.01) | |
| *G01R 22/06* | (2006.01) | |

(52) U.S. Cl.
CPC ....... *H04W 12/125* (2021.01); *G01R 19/2513* (2013.01); *G01R 22/066* (2013.01); *H04L 67/12* (2013.01); *H04Q 2209/60* (2013.01); *Y02D 30/70* (2020.08); *Y02E 40/70* (2013.01); *Y04S 10/50* (2013.01); *Y04S 20/00* (2013.01); *Y04S 20/221* (2013.01); *Y04S 40/00* (2013.01); *Y04S 40/18* (2018.05); *Y04S 40/20* (2013.01)

(58) Field of Classification Search
CPC .. G01R 22/066; H04L 67/12; H04Q 2209/60; Y02D 30/70; Y02E 40/70; Y04S 10/50; Y04S 20/00; Y04S 20/221; Y04S 40/00; Y04S 40/18; Y04S 40/20
See application file for complete search history.

(56) References Cited

OTHER PUBLICATIONS

Kong et al., "Cost Efficient Data Aggregation Point Placement With Interdependent Communication and Power Networks in Smart Grid" IEEE Transactions on Smart Grid, vol. 10, No. 1, Jan. 2019 (Year: 2019).*

Sarobin "Optimized Node Deployment in Wireless Sensor Network for Smart Grid Application" Wireless Personal Communications (2020) 111:1431-1451 (Year: 2020).*

* cited by examiner

| MGA | f (PT) | Avg (iPT) |
|---|---|---|
| 1 | 15 | 19 |
| 2 | 20 | 18 |
| 3 | 17 | 16 |
| 4 | 18 | 17 |
| 5 | 2 | 8 |
| 6 | 1 | 6 |
| 7 | 4 | 10 |
| 8 | 3 | 7 |
| 9 | 13 | 5 |
| 10 | 16 | 10 |
| 11 | 12 | 8 |
| 12 | 5 | 15 |
| 13 | 8 | 17 |
| 14 | 6 | 14 |

*Fig. 5*

OPTIMAL COMMUNICATION ARCHITECTURE FOR SMART DISTRIBUTION POWER GRID

CROSS-REFERENCE TO RELATED DOCUMENTS

The present application is a divisional application of U.S. application Ser. No. 17/474,764, filed Sep. 14, 2021, which is a continuation-in-part of U.S. application Ser. No. 16/436,059, filed Jun. 10, 2019, now issued as U.S. Pat. No. 11,138,678, issued on Oct. 5, 2021, which is a continuation of U.S. application Ser. No. 14/719,786, filed May 22, 2015, now issued as U.S. Pat. No. 10,346,934, issued on Jul. 9, 2019, which claims priority to U.S. provisional application 62/032,207, filed Aug. 1, 2014. Disclosure of the parent applications is incorporated in entirety at least by reference.

BACKGROUND OF THE INVENTION

1. Field of the Invention

The present invention is in the field of electric grid management and pertains particularly to methods and apparatus for reducing power requirements and network costs associated with detecting and reporting power theft on a micro power grid.

2. Discussion of the State of the Art

In the field of electric grid management, it is desired to reduce or eliminate the theft of power from a power grid. Theft of electricity from the power grid is more prevalent in developing countries like India for example where power theft losses amount to roughly one and one-half percent of gross domestic product (GDP). A micro power grid is a networked topology of intelligent processing nodes capable of collecting and processing information and of reporting collected information from node to node and eventually to a control facility via wireless communications.

The process of detecting power theft events that are not transmission losses due to natural events or other unexplained losses in power involves the collection and processing of power usage data on the grid and at least one algorithm for isolating the power theft current data from other available data relative to power usage.

A power theft detection algorithm known to the inventor is used to determine and isolate power theft data from other data on a micro grid. One challenge in power theft detection on a micro grid is that monitoring grid state and reporting power thefts via a plurality of intelligent processing nodes raises cost of communications for the particular network or topology of those distributed nodes on the grid.

Another challenge with sustaining power theft detection and reporting on the grid is that the components of the wireless communications network are typically distributed in overlay fashion over the power grid topology and also draw their power from the grid. Therefore, having these components always in an on state or requiring those components to stay on for longer "wake" periods to handle communications load can lead to sustainability issues regarding available energy on the grid. Furthermore, handling often piggybacked multi-hop data messages creates more network latency on the administrative portion of the grid and can result in bill processing delays.

Therefore, what is clearly needed is apparatus that reduces power requirements and network costs associated with detecting and reporting power theft on a micro power grid, and further provides an integrated micro-grid system. Also needed is a cost-optimal model.

BRIEF SUMMARY OF THE INVENTION

In one embodiment of the invention a method for implementing a micro grid within a Smart Distribution Power Grid (SDPG) is provided, comprising placing smart meters at consumer sites in the SDPG, the smart meters enabled to sense current and current direction and to communicate wirelessly from individual ones of consumer sites within an area of the micro grid to a s Smart Distribution Node (SDN), determining a set of Smart Distribution Nodes of a number, placement and data packet transfer technology to transfer data from the smart meters to a Micro Grid Controlling Station (MCS), the set determined in a manner to provide cost optimization, where cost is determined form at least original node costs, data packet hops, operating costs and maintenance costs, and implementing the set of SDNs along a power grid topology (PGT) of the micro grid, such that data is transmitted from each smart meter to a proximate SDN and through other SDNs to the MCS.

In one embodiment the determination is made using an algorithm that considers the PGT, a given life-time of the smart grid (Y), frequency of the data packet (Pf), allowable latency of the data packet (L), a bandwidth requirement of a data packet (B) as one input and accepts $CT_t$ (Communication Technologies), t=1, 2, 3 . . . k, a probability of link unreliability (p) and a reliability constant (Rel) as another input. Also, in one embodiment the algorithm initially assumes a longest branch (LB) of the given PGT. Also, in one embodiment the algorithm assumes installation cost, maintenance cost, communication cost, and flow bandwidth. And in one embodiment In one embodiment the algorithm runs a cost optimal model for configuring a distribution grid with smart communication devices wherein the algorithm minimizes a hybrid communication infrastructure cost (C) for the distribution grid according to:

$$C = \sum_{t=1}^{k} \quad (1)$$
$$[n_t \times (I_c(t) + (\delta_t \times Y \times 12) + (C_t \times Y \times P_f \times (N_r + 1))) + Y \times (C_t(t))^{(nscn+n_t)}]$$

$$\text{subject to:} \sum_{t=1}^{k} [n_t - 1] \times r_t \times (1-p)^2 \geq D \quad (2)$$

$$N_r + 1 \geq 1/(1-p) \quad (3)$$

$$\sum_{t=1}^{k} [N_r + 1 \times (L_{link} + t = r) \times n_t] \leq L \quad (4)$$

$$\sum_{t=1}^{k} [n_t - 1] \times p] \leq Rel \quad (5)$$

$$n_t \geq 0 \quad (6)$$

$$0 \leq p < 1 \quad (7)$$

$$\text{Max}(b_{link}) \leq \text{Min}(B_t) \quad (8)$$

wherein:
  $\delta_t$ is Maintenance cost for an intelligent device
  $C_t$ is Cost of communication for a technology
  $N_r$ is Number of re-transmissions
  $I_c$ is Installation cost of an intelligent device
  $l_{link}$ is Data latency experienced in the link
  t is Delay for transmitting a packet from an intelligent device r is Delay for receiving the packet from an intelligent device
$r_t$ is Communication range based on the technology
Y is Number of years
$P_f$ is Frequency of packet transmission
$n_t$ is Number of intelligent devices with technology 't'
$C_t(t)$ is Cost of information capacity requirement for technology 't'
$n_{SCN}$ is Number of smart buildings in microgrid
p is Probability of communication link unreliability
$b_{link}$ is Flow bandwidth for the data packet
$B_t$ is Maximum flow bandwidth of the technology
L is Latency allowed for the data packet to reach its end destination; and
Rel is Reliability factor Also, in one embodiment the algorithm returns the optimal number of SDNs with given communication technology combinations and the optimal cost for the hybrid communication network infrastructure. Also, in one embodiment the algorithm executes the cost optimal calculation model determining the optimal hybrid communication infrastructure cost and an exact quantity of with specific communication technologies with minimal cost subject to Quality of Service (QOS) parameters of each technology and QoS requirement of a data packet generated by a Smart Consumer Node (SCN) at a smart building in the distribution grid. In one embodiment the cost optimal model assumes ZigBee, Wi-Fi and Cellular as the specific communication technologies in the cost optimal calculation.

In one embodiment of the method the QoS parameters considered for each specific technology include data packet latency, bandwidth requirement, link reliability, packet drops and communication range of the technology, for derivation of the cost optimal solution. And in one embodiment the algorithm assumes a PGT with four branches including a longest branch (LB) and assumes ZigBee, Wi-Fi and Cellular as the specific communication technologies.

BRIEF DESCRIPTION OF THE SEVERAL VIEWS OF THE DRAWINGS

FIG. 5 is a table depicting power theft frequencies and average power theft currents recorded during a power check time period for a number of identified micro power grid segments.

DETAILED DESCRIPTION OF THE INVENTION

In various embodiments described in enabling detail below the inventor provides apparatus and methods for controlling how power theft information is collected and processed on a micro grid of a "smart" electricity distribution grid. The present invention is described using the following examples, which may describe more than one relevant embodiment falling within the scope of the invention.

Figure 1:
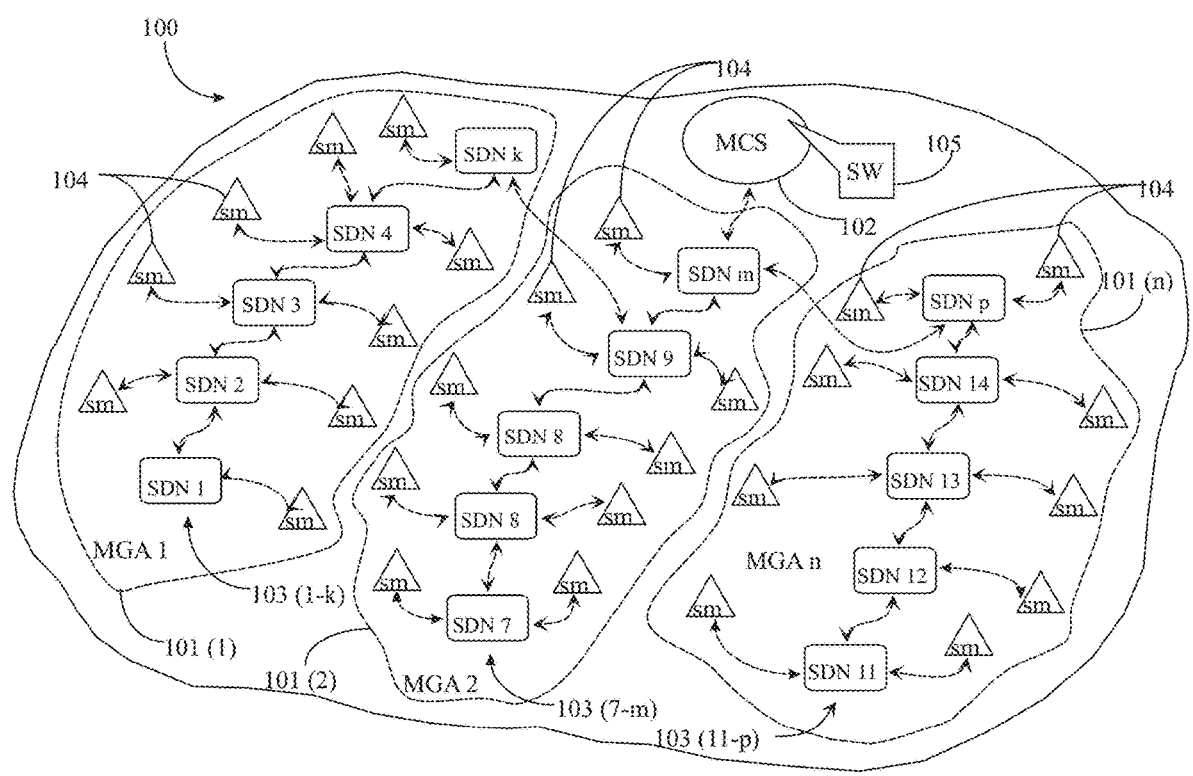
FIG. 1 is an architectural view of a micro power grid divided into individual grid segments in an embodiment of the present invention.

FIG. 1 is an architectural overview of a micro power grid 100 divided into individual grid segments in an embodiment of the present invention. Micro Power Grid 100 may be part of a larger smart electricity distribution grid. Micro grid 100 comprises a number of topologically isolated grid segments 101 (1-$n$), also referred to herein as micro grid areas (MGAs). An MGA may include connected power consumers located along an electricity distribution line or branch of the grid.

Each MGA 101 (1-$n$) includes a plurality of smart distribution nodes (SDNs) arranged in overlay fashion along an electricity distribution path through the topology of the MGA. MGA 101 (1) includes SDNs 103 (1-$k$) distributed along the path of electricity distribution such as one per pole for elevated power lines. Each SDN 103 (1-$k$) includes a processor or microcontroller, and at least one current sensor that measures current going through the line in both directions. MGA 101 (2) includes SDNs 103 (7-$m$) and MGA 101 ($n$) includes SDNs 103 (11-$p$).

It is important to note herein that a MGA may include more than a single electricity distribution main, cable, branch, or path without departing from the spirit and scope of the present invention. SDNs 103 (1-P) represent a total number of SDNs in visible micro grid 100. There may be more or fewer SDNs integrated to micro grid 100 without departing from the spirit and scope of the present invention. SDNs 103 (1-$k$) in MGA 101 (1) are enabled to communicate with one another by onboard wireless communications modules each having a range that at least reaches a next SDN in line. The communications may be hosted by a wireless fidelity (WiFi) network, a Zigbee wireless network, or other wireless services should they be available and more appropriate for the distribution architecture of the SDNs.

Each MGA 101 (1-$n$) includes a plurality of smart meters (SMs) 104. SMs 104 are designed for distribution to consumer sites within range of communication of one or more SDNs. SMs 104 include at least one current sensor that is capable of measuring the current through the meter bi-directionally. There may be one or more SMs distributed to a power consuming location such as a smart home network or commercial network. One SDN may regularly communicate with one or more than one SM 104 in real time.

A SM 104 includes one or more sensors to measure current bi-directionally as it flows through the meter. SMs 104 measure the current in both directions and communicate via wireless communications module with the closest SDN. In this way a tree-like topology for the micro power grid is provided in overlay fashion and the components are integrated (hard wired/plugged into) to the power grid. SMs 104 represent the bottom level in component hierarchy and report to the nearest SDNs within range. Each SDN 103 (1-$p$) measures the current flowing through it and forwards the data upstream to the next SDN in a current packet (CP). In this particular example, there is one top or parent SDN 103 ($m$) within MGA 101 (2). The process repeats at each SDN in the line within each MGA 101 (1-$n$).

SDNs may receive CPs from all of the descendant nodes and may extract and average the values, including the direction vectors indicating the direction of the current. Therefore, each SDN processes data received from all of the currently active descendant nodes and passes the information upstream to the next node before becoming inactive again during the routine.

Micro grid 100 includes a micro grid control (MCS) station 102 analogous to a master server that controls the micro grid segment-by-segment, introducing flexibility in control options for the entire micro grid. MCS 102 includes at least one processor and is coupled to at least one data repository. MCS 102 also hosts software (SW) 105 executing on the at least one processor from a non-transitory medium. MCS 102 communicates directly with the top or parent SDN 103 ($m$). SW 105 includes instructions for collecting and processing information from down-line components on the micro grid to obtain power theft information for each MGA comprising micro grid area 100 under control of MCS 102. SW 105 utilizes the resulting data calculated by algorithm for each MGA 101 (1-$n$) to classify each of the MGAs according to the data analyzed.

In classifying the MGAs, the system learns which of those MGAs are experiencing higher power theft issues and which of those MGAs are not. SW 105 includes instruction for resetting the time interval between a power theft check for an MGA and instruction for changing or adjusting the hop count (number of node hops up stream for data packets). This process may or may not be initiated for an MGA because initiation may depend upon the classification assigned to an MGA under control of the MCS. Moreover, the process is dynamic and may be set to occur upon MCS determination of a change in classification for an MGA under its domain. The hop count is equal to the number of times a packet must stop at an SDN for processing. In one embodiment, packets may pass through an SDN without interception for processing such as if the particular SDN was subtracted from the previous hop count. Packets may also completely bypass an SDN (SDN dropped) and sent to the next one further upstream provided the target SDN is within wireless communications range.

Generally speaking, a MGA that is classified as having higher power theft ratio may be monitored at more nodes (higher hop count) and therefore may experience a longer power theft check period duration. MGAs that experience a much lower power theft ratio may have hop counts reduced which may lead to shorter power theft check duration. In one embodiment where hop counts are reduced along an MGA line, the remaining hop counts may be kept stable while the hop addresses (SDNs) are rotated periodically adding and subtracting the same number of addresses at each rotation to maintain the same hop count.

Figure 2:
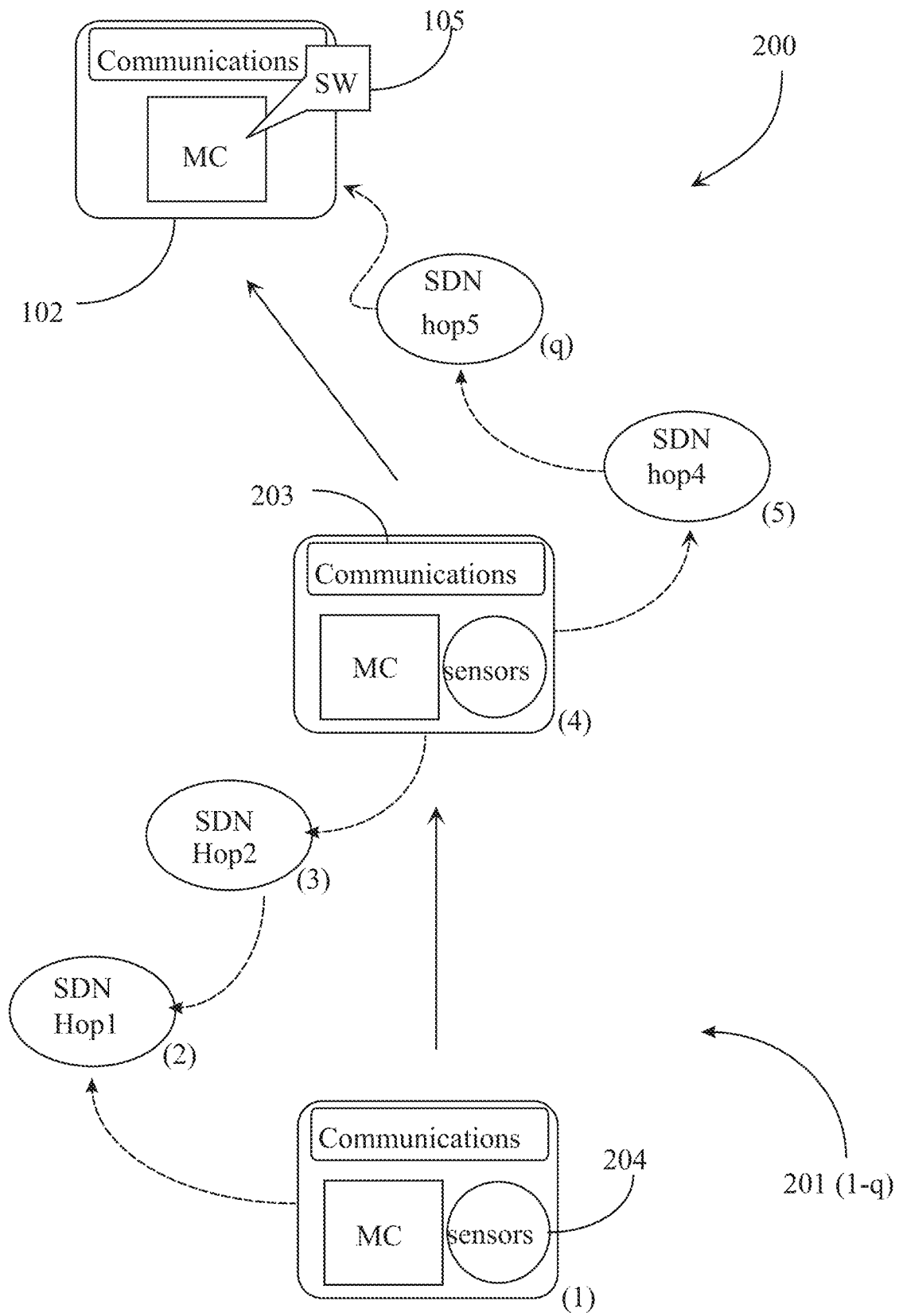
FIG. 2 is a block diagram depicting smart distribution nodes downstream from a micro grid control station.

FIG. 2 is a block diagram depicting micro grid area line 200 with smart distribution nodes downstream from a micro grid control station. Smart distribution nodes (SDNs) 201 (1-$q$) are analogous in description to any of SDNs 103 (1-$p$) of FIG. 1. In this example a single hierarchal line of SDNs represent an arm of the micro grid or a micro grid area (MGA). SMs are not depicted in this example but may be assumed present.

Each SDN 201 (1-$q$) has one or more sensors 204 to measure current going through the device in both directions in the line. For example, there may be one SDN at every power pole having branch off to consumers. During a power theft check routine, each SDN measures and records the total current going through it sending the recorded information upstream. Each SDN waits for packets from descendant SDNs downstream that include the current values recorded at those locations on the grid. At the top of the SDN hierarchy the reported current values of the descendant SDNs and connected SMs may be extracted and summed. All of the current information from bottom layer SMs to the parent SDN for the micro grid is aggregated at micro control station (MCS) 102 also depicted in FIG. 1. The information includes direction vectors indicating the direction of the current measured at each reading collected and for computed current averages. Each SDN 201 (1-$q$) includes a wireless communications module 203 for communications and a micro controller (MC) for processing data.

In this example data is depicted as being passed upstream to MCS 102 executing SW 105. In one embodiment a total hop count may be enforced that includes stops at each SDN on line 200 before MCS 102 receives all of the power theft data. The total hop count equals five hops from SDN 201 (1) representing the most remote SDN from the MCS. In one embodiment reducing the hop count simply means eliminating some SDN addresses from the destination list. In this example, SDNs 201 (2), (3), (5), and (q) may be eliminated from the hop count. In this case the hop count is reduced to one hop at SDN 201 (4) before MCS 102 receives the data as illustrated by solid arrows between the active or "awake" nodes.

In one embodiment reducing the hop count also deactivates the eliminated SDNs from reporting at all during a power check theft routine. In this embodiment the hop count may be maintained during a subsequent power theft check routine while the hop count addresses are rotated out eliminating nodes that reported in the last check and incorporating the nodes that were eliminated in the last check. Such leeway is allowable if classification of an MGA results in very low power theft ratio to total current.

In one embodiment hop counts can be reduced without eliminating participation of a node in the power theft check data collection. For example, different hop patterns such as stop at every other node in the line of nodes. In one embodiment the wireless range of a communications module 203 may be a factor that influences the degree of hop count adjustment (to lower counts). An SDN may only communicate with other SDNs that are within wireless range. However, the wireless range may vary widely depending on infrastructure involved.

In one embodiment hop counts are reduced for an MGA line of components such as line 200 leading to a shorter period of runtime during a power theft check because each SDN waits for fewer messages arriving from downstream components. Also, the time period between power theft check routines for an MGA may be lengthened according to algorithmic processing of current data for the MGA and its resulting classification. This allows power conservation with respect to the power requirements of the nodes on the grid by enabling less processing time individually and more sleep time between power theft routines. Likewise, the reverse may also happen (rise in hop count and shortening of time interval between checks) according to the most recent data results and classification of an MGA. In this way MGAs on the micro grid that have higher power theft statistics receive more scrutiny while areas reporting lower power theft statistics receive less scrutiny.

Figure 3:
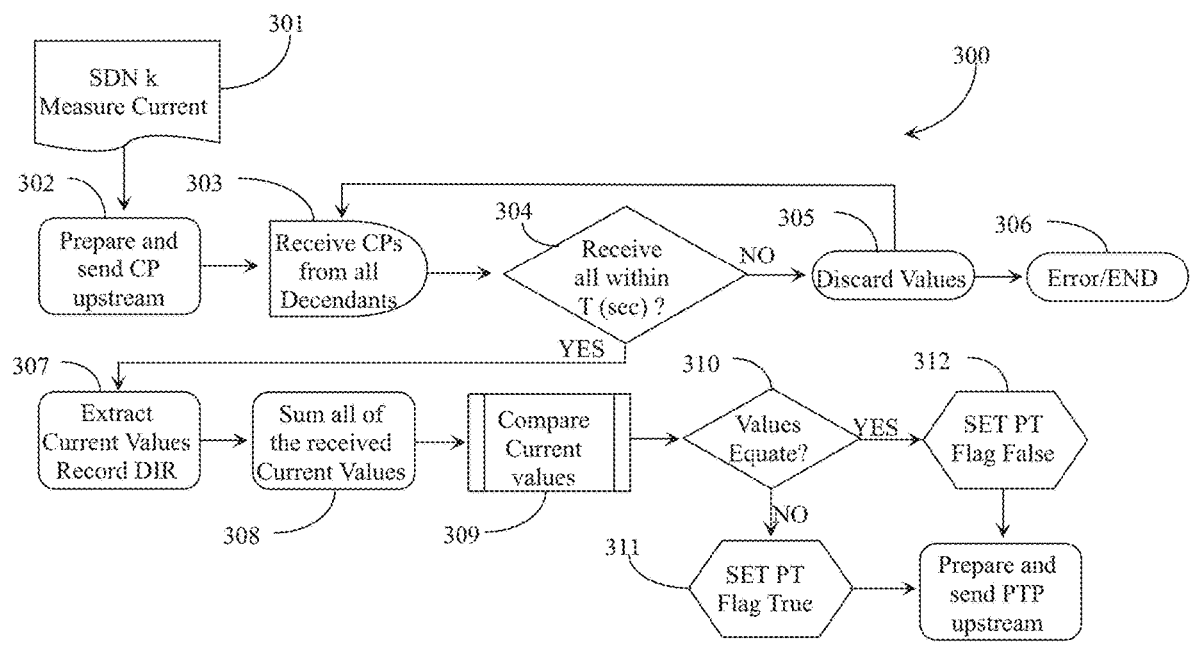
FIG. 3 is a process flow chart depicting steps in determining power theft on a micro grid segment.

FIG. 3 is a process flow chart 300 depicting steps in determining power theft on a micro grid segment. At step 301, a smart distribution node such as SDN 101 (*k*) of FIG. 1 measures and records the total amount of current (ik) going through it in both directions. In one embodiment the current through the SDN may be measured using Kirchhof's Current Law (KCL) know to the inventor. At step 302, the SDN generates and sends a current packet (CP) upstream to the next SDN on the current hop list. The current packet sent may minimally include the source identification (ID) of the sending node, the direction of the current measured, and the total amount of the current measured, the time stamp for the measurement, and the destination ID to the next node on the hop list. Current values for both directions may be included in the same current packet without departing from the spirit and scope of the present invention.

The SDN waits to receive all of the current packets (CPs) from all of its active descendant nodes at step 303. At step 304 the SDN may make a determination if it has received all of the expected current measurements from the descendant nodes in the MGA tree. In one embodiment a timeout period may be enforced wherein the SDN must receive all of the data or 100% reporting before the period is set to expire. At step 304, if the SDN has not been able to receive data from all of the expected descendant nodes within the time period, the SDN may abandon all of the values that were received in step 305 and perform an error/end operation at step 306. This may end the process for the particular SDN or the SDN may try again a number of times before ending. In the case of retry, the SDN may re-measure the current going through it and send another CP packet. In case of error, the error message sent from the SDN may be to notify administration entities to look at and fix any problems such as node failure, line failure, etc.

If at step 304 the SDN has accounted for all of the expected messages, it extracts at step 307 all of the current values reported including direction information (DIR) flag indicating the direction of the current readings. At step 308 the SDN may sum all of the current values for both directions. The summation might be expressed as $i_{dk} = \Sigma_{j=1}^{n} t_{dir}^{I} \times i_{I}$ (1).

At step 309 the SDN may compare the summed current values with the current values recorded for that SDN. At step 310 it is determined whether or not the values can be equated to one another within an acceptable level that might account for transmission (TX) loss (copper loss), and an acceptable error range expressed in the data [if ik=idk−TX Loss+/−Err val].

If at step 310 the values are equal within the pre-defined error range, the SDN may determine to set a power theft indication flag to false at step 312 indicating low or no power theft issues with that data. If the SDN determines that the values do not equate satisfactorily, the SDN may set the power theft flag to true at step 311, indicating power theft detection. The SDN may prepare a power theft packet (PTP) containing the results of the information processed at that node and send it upstream according to one embodiment to the controlling MCS. The power theft (PT) message may minimally contain the source identification (ID) of the sending node, the direction of the PT current detected, the total amount of the PT current, the time stamp for the calculated results, the PT flag setting, and the destination ID to the MCS that controls the MGA.

It is important to note that the process of summing and comparing current values may be allotted to each SDN on a distribution line or to just the SDN retaining the highest position in the SDN hierarchy for an MGA. In that case the last SDN may contain the logic or instruction to perform those routines described above. In another embodiment each MGA has a top SDN that reports directly to a single MCS that controls the micro grid. In this embodiment the MCS may process the raw data collected from the descendant nodes in each MGA of the micro grid without departing from the spirit and scope of the present invention. In another embodiment each SDN performs the same processing and messaging tasks with each SDN in the line re-calculating results after reporting its own current data. The algorithm that is used to calculate the power theft data is known to the inventor as a power theft detection algorithm (PTDA).

The algorithm in basic format may be expressed as follows:

Measure current (ik)
Send CP message
Wait (t<Tsec) until Receive [CP1, CP2,...,CPn]

-continued

```
If (!Receive [CP1,CP2,...,CPn] &&t>Tsec )
  Discard CP1, CP2,...,CPn
  After 'm' number of rejection of CPs, Send message to MCS
else if ((Receive [CP1,CP2,...,CPn] &&t<T
  Extract current values i1, i2...in
  Insert sign according to the direction ijdir
```

15.     $i_{dk} = \sum_{j=1}^{n} i_{atr}^{ij} \times i_j$

16.     Compare ( $i_{ks}$, $i_{dk}$ )
17.     if ( $i_k == i_{dk} - Tx_{loss} \pm Err_{val}$ )
18.     $PT_{?ag}$ = false
19.     end if
20.     elseif ( $i_{k}! = i_{dk} - Tx_{loss} \pm Err_{val}$ )
21.     $PT_{?ag}$ = true
22.     send $PT_{msg}\{src_{jk}, i_{air}, i_{PT}, PT_{?ag}$ = true, timestamp, mcs} to MCS
23.     end if
24.     end if In one embodiment of the invention, step 302 may be performed after step 304 if it is determined that the SDN has received all messages from descendants within the time T. If T expires before all messages are received, then step 302 may not be performed to reduce redundancy.

Figure 4:
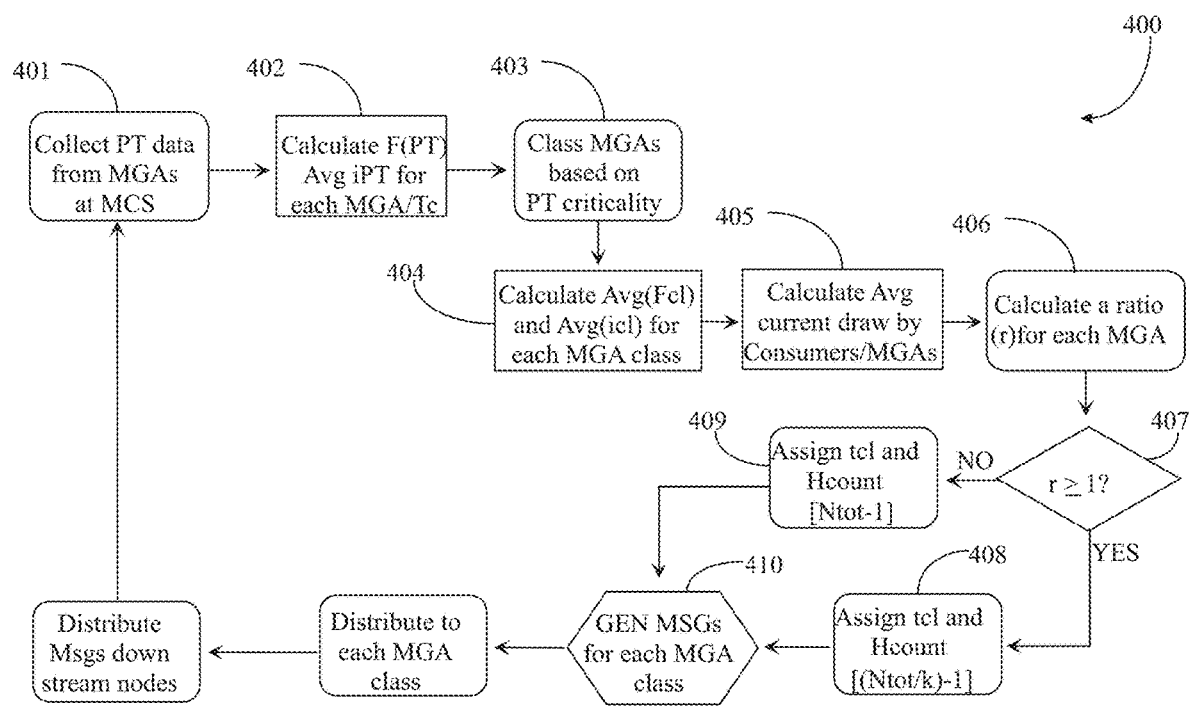
FIG. 4 is a process flow chart depicting steps in dynamic adjustment of power theft check periods and the number of current data transmission hops enforced for individual micro power grid segments in an embodiment of the present invention.

FIG. 4 is a process flow chart 400 depicting steps in dynamic adjustment of power theft check periods and the number of current data transmission hops enforced for individual micro power grid segments in an embodiment of the present invention. Process 400 may be added onto the end of process 300 described above. At step 401 all of the power theft (PT) data for each MGA on the micro grid under MCS control are collected at the controlling MCS. The power theft data is collected using the power theft detection algorithm (PTDA) described further above for Tc duration (time of data collection). An algorithm is provided and termed by the inventor Efficient Power Theft Data Networking Algorithm (EPTDNA). EPTDNA works with PTDA to more efficiently communicate and collect the power theft information. The power theft data is collected from all of the MGAs under the control of the MCS. To might be in the order of days or weeks.

At step 402 the MCS with the aid of SW analogous to SW 105 of FIG. 1, calculates the frequency (F) of detected power theft (PT) events and the average power theft current iPT for each MGA during the time Tc, which is the time allotted for collection of PT data for a MGA. Based on the power theft data calculations, the MGAs are each classified at step 403 according to the criticality of the data results using an available algorithm such as medoid or k-means. In one example, there may be three categories such as frequently identified MGA (FMGA), occasionally identified MGA (OMGA), and extremely unlikely identified MGA (EUMGA). Power theft statistics are higher in FMGAs, lower in OMGAs and lower still in EUMGAs. There may be more or fewer categories of classifications of power theft criticality without departing from the spirit and scope of the present invention.

At step 404, the MCS with the aid of SW 105 of FIG. 1 calculates the average frequency of power theft data in each class (Fcl) of MGAs and the average power theft current (icl) for each class of MGAs. At step 405 the MCS calculates the average maximum current draw by consumers (icon) for all the MGAs under control of the MCS. At step 406 the MCS calculates a ratio (r) for each MGA under the control of the MCS where the ratio equals the average maximum consumer draw on the MGA divided by the average power theft current iPT for the MGA. At step 407 the MCS determines if r is greater than or equal to 1 for each MGA.

If r is equal to or greater than 1 in step 407 the process moves to step 408 where the MCS sets tcl (time duration before a periodic power theft check may occur on the MGA). The MCS also sets the transmission hop count (Hcount) for the MGA as the total number of nodes divided by the k factor−1. If else at step 407, then the process moves to step 409 where the MCS sets tcl and the Hcount for the MGA as the total number of nodes−1 [Ntot−1]. In the case of r being greater than or equal to 1, the tcl=the average Tc value or (Tcl) for the MGA class. Tc is the time duration for the EPTDNA phase-one data collection time duration for an MGA. In the case of r being less than one, then tcl is=to Tcl multiplied by r. Steps 409 and 408 are assigned for a class of MGAs. Therefore, every MGA in a particular class of MGAs will be assigned tcl and Hcount.

At step 410 the MCS generates messages to each of the MGAs in a class of MGAs under control of the MCS. A message assigning tcl and Hcount to a class of MGAs is distributed only to SDNs in those MGAs. The parent SDNs (closest to MCS) in each MGA may be responsible for distributing the information to descendant components (SDNs) within each MGA. SDNs may also update smart meters located in the same MGAs hosting those SDNs. The new tcl and Hcount for an MGA classification replaces the old setting and persists through the next Tc duration.

Figure 6:
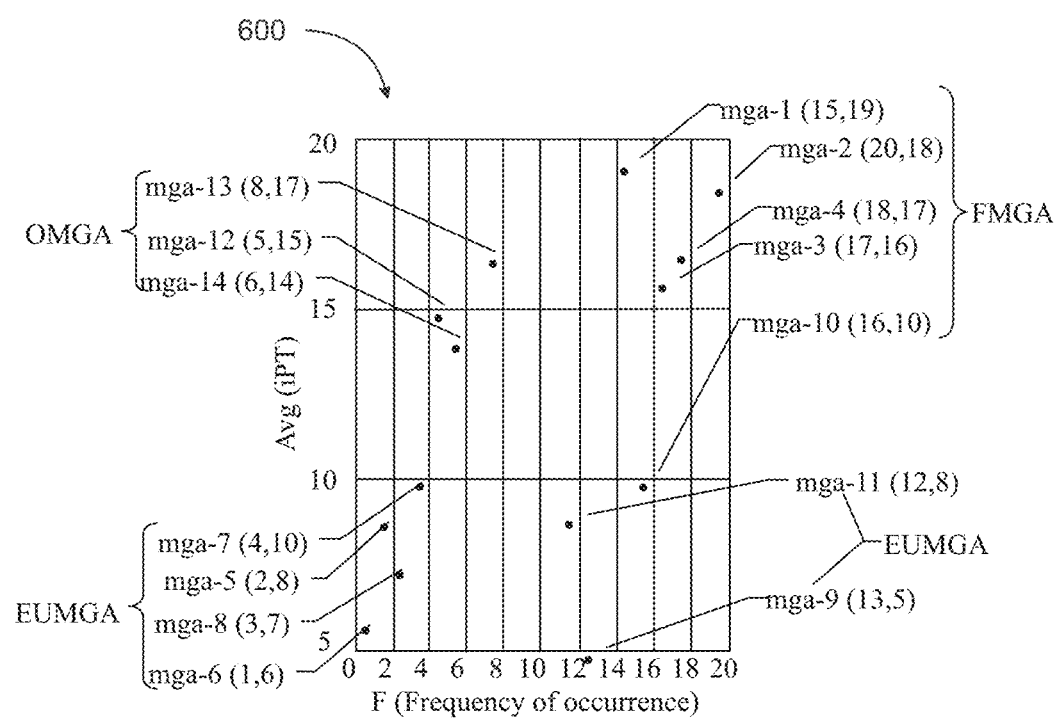
FIG. 6 is an x/y graph depicting the plotted locations of the micro power grid segments of FIG. 5.

FIG. 5 is a table depicting power theft frequencies and average power theft currents recorded during a power check time period (Tc) for a number of identified micro power grid segments. FIG. 6 is an x,y graph depicting the plotted locations of the micro power grid segments of FIG. 5.

Referring to FIG. 5, the identified micro grid segments listed in table 500 are referred to by the inventor as Micro Grid Arrays (MGAs). In table 500, the first column under MGA lists 14 MGAs making up a micro grid controlled by a micro grid control station (MCS).

Listed in the column adjacent to the MGA column, are the numbers of power theft events detected as a result of processing collected current data for the MGAs. The numbers represent frequency of detections over the duration Tc for each MGA. Table 500 includes a third column listing the average power theft current [Avg (iPT)] for each of the fourteen MGAs making up the micro grid. Current is measured in amperes.

The data provided in table 500 is utilized to classify each of the MGAs according to three classes of MGAs namely frequently identified MGA (FMGA), occasionally identified MGA (OMGA) and extremely unlikely MGA (EUMGA). There may be more or fewer that three categories without departing from the spirit and scope of the present invention. It is also important to note herein that both the frequency of power theft events and the average power theft current are used as input to calculate a class for an MGA using an algorithm adapted for the purpose like medoid or k-means described further above.

Other tables might be derived and made available such as a table depicting the average frequency of power theft (Fcl) for a class of MGAs and the average power theft current [Avg (icl)] for the class. Still another table may depict the average time (Tcl) in days allotted for power theft check data collection and processing for a class of MGAs, the power theft ratio (r) calculated and averaged for the class, and the average time expiring after Tcl ends and before periodic power checks begin for the class.

Referring now to FIG. 6, x,y graph 600 depicts the plotted positions of classified MGAs one through fourteen listed in FIG. 5 above according to the data. On this two-dimensional graph, x=the frequency (F) of power theft data events detected during period Tc and y=the average power theft current draw [Avg (iPT)].

MGAs classified as FMGAs include MGAs 1-4 and 10 clustered generally to the upper right portion of the graph. MGAs classified as OMGAs include MGAs 12-14 generally clustered to the left and upper portion of the graph. MGAs classified as EUMGAs 5-9 and 11 generally clustered in the left lower portion of the graph.

Classification of MGAs associated with a lower power theft frequency and average current draw may result in adjustment in the number of times or hops that messages on the classified MGAs must undergo before reaching the MCS controlling those MGAs. Thus, Tc (time for data collection and processing) may be shortened due to lower messages processing load and network latency. Moreover, power theft check intervals for those classified MGAs may be adjusted higher enabling the nodes drawing power from the micro grid to sleep longer in a low power mode like sleep mode or standby mode or powered off for longer periods.

EPTDNA enables network flexibility and frees up more bandwidth to enabling better focus on the more urgent power theft trends affecting the micro grid. It will be apparent to one with skill in the art of networking that a MCS in control of a micro grid may communicate with other MCSs controlling adjacent micro grids installed across a region. Therefore, reductions in network latency, and node processing times on a micro grid may be accumulative across the larger smart distribution power grid.

Even though a smart grid can provide effective solutions for many problems in the Indian electrical grid, it still remains as a concept. This is because it is almost impossible to transform the entire grid that consists of generating section, transmission section and distribution section smart in one stretch. Even if distribution section is taken alone, it is difficult to make it smart as different distribution lines are emerging from the distribution substation to different areas and again it splits at the distribution transformer into different secondary distribution lines that goes to the secondary consumers. The control operations inside such a distribution section of the grid would be too complex. Hence in the present system a cluster-based approach by dividing the distribution section into micro-grids is a good method to make a better smart distribution power grid.

Figure 7:
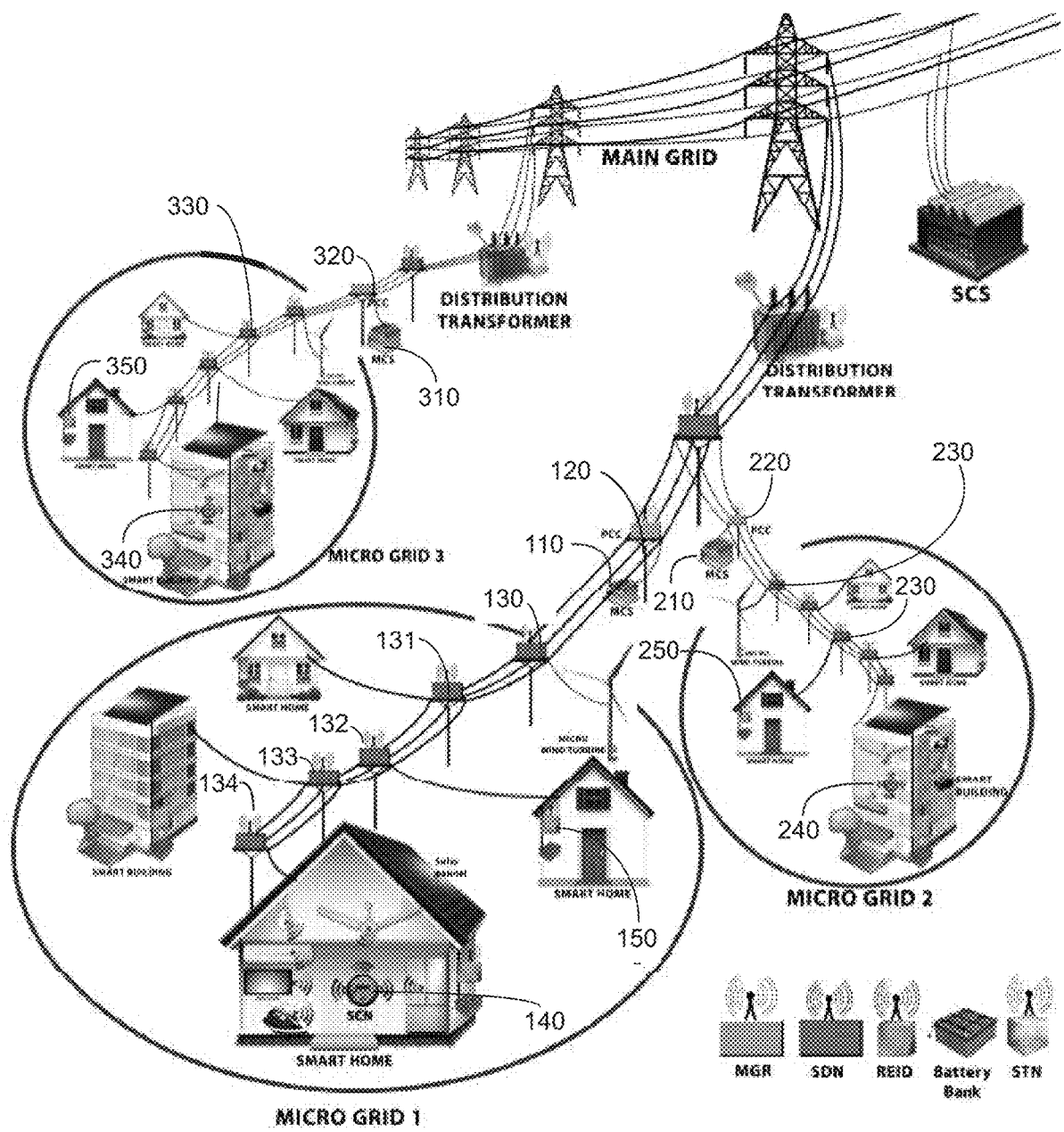
FIG. 7 depicts an architecture for a smart distribution power grid in an embodiment of the invention.

FIG. 7 illustrates architecture of the smart distribution power grid. As shown in FIG. 7, the SDPG is divided into regional groups called microgrids (MG1, MG2, MG3, . . . MGn) of the electrical system which can function either in an islanded mode (which is a standalone mode) or in grid-connected mode (which is a dependent mode). Major functional requirements of micro-grid are:
1. Monitoring and control of power generation per consumer
2. Monitoring and control of energy usage per consumer
3. Monitoring and control of distributed power generation of the microgrid
4. Monitoring and control of distributed energy consumption of the micro-grid
5. Maintaining energy sustainability inside a micro-grid
6. Seamless switching from grid-connected mode to islanded mode
7. Prevention of disruption in electricity supply
8. Detection and localization of faults
9. Detection and localization of power theft
10. Self-healing capability
11. Maintaining power quality As shown in FIG. 7, in order to achieve the aforementioned functional requirements of the micro-grid unit, each micro-grid has at least one set of intelligent entities such as a Smart Consumer Node (SCN) (140,240,340), Smart Distribution Node (SDN) (130,230,330), renewable Energy Intelligent Device (REID) (150,250,350), Smart Transformer Node (STN) associated with main grid, Micro-Grid relays (MGR) (120,220,320) and Micro-grid Controlling Station (MCS) (110,210,310).

The MCS (110,210,310) associated to each micro-grid (MG1, MG2, MG3) controls the entire functionality of the micro-grid. All other intelligent entities (120,130,140,150) inside the micro-grid (MG1) communicate with MCS (110) in the case of local decision making. MCS (110) which is positioned at point of common coupling (PCC) of the micro-grid (MG1) and main grid collects all the local information, takes global decisions and informs the other intelligent entities. The MCS (110) along with SCNs (140) and IDs (150) monitors and controls the distributed power generation and energy consumption inside the micro-grid (MG1). The MCS (110) which can receive and send data consists of a communication module, a smart database module, and two visualization modules.

The data received by MCS (110) can be viewed by the authority and a constrained subset of those data can be viewed by consumers, such as real time consumption details, their bill amounts, real-time tariff changes with respect to peak and off-peak hours, and total consumption per month. The electric grid parameter values received in the controlling station is stored in the smart grid distribution system database.

MGR (120) situated at PCC (FIG. 7) ensures seamless switching of the micro-grid from grid-connected mode to islanded mode and vice versa. Usually, the micro-grid will be in grid-connected mode. If any electrical disturbance or fault occurs in the main grid, the micro-grid goes to islanding mode, thereby separating it from the rest of the grid such that it remains unaffected by the voltage or frequency instability, and continues normal operation consuming power from the Distributed Energy Generation (DEG) units. Thus, the micro-grid ensures the quality of power delivered inside the micro-grid.

The SDNs (130,131,132) placed on the top of the distribution poles measure the current flow and voltage of that point of line where the SDN (130) is placed. By the communication with the descendants of SDN (other SDNs (131,132) or SCNs (140)), it detects and localizes the power thefts and line faults. The SDN (130,131,132) consists of current sensor and voltage sensor to measure the current flow and voltage, processing unit to make decisions after processing the data from the descendants and its sensors, communication module to transfer sensor data and decisions to next nearby SDN and MCS, 15 and a circuit breaker or relay to isolate the faulty grid line whenever required.

SDNs with power rerouting mechanisms ensure supply of electricity to consumers in the cases of line faults as well, thereby adding self-healing capability to the micro-grid.

As shown in FIG. 7, each micro-grid has multiple distributed energy generation units (DEG units) and storage units within it, for making the micro-grid energy sustainable. These DEG units makes use of renewable energy sources like solar panels or wind turbines which can be used for harvesting energy that will be stored in battery banks located nearby. A Renewable Energy Intelligent Device (REID) is connected to it for controlling storage and supply of power from these generation units. REID helps MCS to control generation and storage of electricity. Thus the coordinated effort of MCS (110), REIDs (150) and SCNs (140) makes the micro-grid (MG1), energy sustainable, at least for some time.

The intelligent entity SCN (140) inside the smart homes or buildings as shown in FIG. 7 helps to monitor consumption and generation of the consumers inside the micro-grid. The SCNs (140) provide the opportunity to MCS (110) to control of energy usage in real-time and to make automatic bills.

SCNs (140) play a major role in dynamic power management inside the micro-grid by adjusting the consumption and generation of electricity in smart buildings whenever a request comes from MCS (110). Voltage and frequency variations of power inside the micro-grid are adjusted by reducing or increasing the consumption or generation at consumers. Thus SCNs (140,240,340) contribute in maintaining power quality inside the microgrid (MG1, MG2, MG3) and also in detecting and localizing power thefts and line faults.

The mode of functions of a micro-grid can be categorized based on its dependency on the main grid into three operational modes, namely islanded mode, partially connected mode and fully connected mode. In islanded mode, the micro-grid functions totally independent to the main grid. In partially connected mode, the contribution of electricity to the micro-grid is divided among the main grid generators and the micro-grid generators whereas in fully connected mode, the micro-grid consumers depend on main grid generators only for electricity. Depending on the requirements of the system, one or several micro-grids can be connected to the main grid and the micro-grids can borrow power from other micro-grids as well. The Smart Transformer Node (STN) together with MCS (110,210) and Smart Control Station (SCS) enables power management between the micro-grids and between the micro-grid clusters and the main grid.

Three-Tier Communication Topology for Smart Distribution Grid

Figure 8:
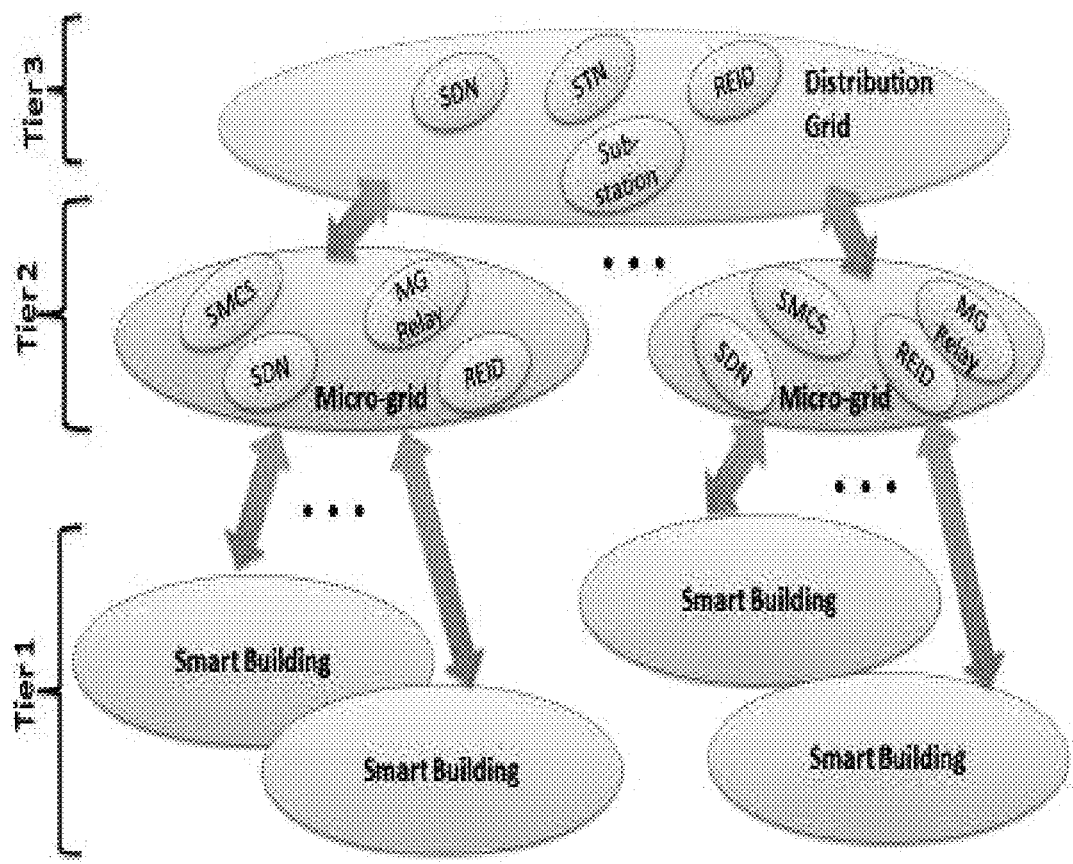
FIG. 8 depicts a three-tier communication architecture for the smart distribution power grid in an embodiment of the invention.

A three-tier communication topology has been derived from the smart distribution power grid architecture shown in FIG. 7. FIG. 8 shows three-tier communication topology eases the transit towards the optimal communication architecture for micro-grid. The first tier includes the communication topology inside a smart home, the second tier includes the communication topology inside a micro-grid, and the third tier includes the communication between the micro-grids and between the micro-grids and the distribution power grid. The present invention teaches communication architecture for the second tier of the three-tier communication topology.

Information Packet Flow Inside the Micro-Grid

The information flow in each tier is characterized by the type of information, frequency of information transfer, size of information, participants involved in the information flow. The information flow in the second tier consists of mainly the data transfer from SCN of smart building to MCS of micro-grid. From the SCN of smart buildings, three types of information have to transfer to MCS. These are:
1. Hourly energy consumption information for billing.
2. Next hour demand (assuming the micro-grid has hour-ahead market).
3. Next hour generation, if the building wants to give power to the micro-grid
(assuming the micro-grid has hour-ahead market).

After every hour the information has to be transferred to MCS as one data packet called Consumer Data Packet (CDP). Error in Consumer Data Packet will affect the billing and also the energy sustainability effort inside the micro-grid. Hence data reliability is a critical parameter for the CDP. Maximum tolerable data packet latency is less than one hour. Depending upon the communication technology used for CDP transfer, the communication range varies and thus also the participants involved in CDP transfer.

The participants involved in the CDP transfer can be SCN, SDNs and MCS in which SCN and MCS are the source and destination respectively and SDNs are the intermediate nodes which forward the packet to the destination. The data reliability is directly connected to the link reliability, assuming there are no cyber threats. The data packets get erroneous due to 20 the effects of wireless interference and path loss. Data packet errors result in retransmission of data packet. This can again cause an increase in communication cost.

SCNs also transfer the data regarding power draw from the micro-grid or power injection to the micro-grid, periodically, to the SDN connected to it for power theft and line fault check. The data packet for power theft and line fault check is called Theft-Fault Detection Packet (TFDP). All SDNs also transfer the TFDP packet to the next nearby SDN. Hence both SCNs and SDNs are involved in TFDP transmission and reception.

The periodicity of TFDP transfer depends on the frequency of anomalous data detected from the micro-grid. Since Theft-Fault Detection Packets have been sent between two nearby intelligent devices, the maximum distance they travel is around 40 m (maximum pole to pole distance). For TFDP as well, data reliability is the important factor, because error in TFDP may lead to wrong decision on abnormality detection. The data latency is not a critical parameter for TFDP because of two reasons, namely, 1) only single-hop transmission is possible for TFDP to detect the fault or theft in the power grid link between the SCN and SDN or between two SDNs and 2) as TFDP is time stamped, SDN compares it with the measured power value at the same time which is stored in SDN memory.

If SDN detects power theft or line fault, then it will send Theft-Fault Packet (TFP) to SMCS. TFP packet contains the power value due to anomalies and the theft or fault detection flags with time stamp and source and destination identifications. The most critical parameter to be considered while sending TFP is the packet latency.

The preferred data packet latency for TFP is less than one second. The Microgrid Control Station (MCS) sends the control messages to SCNs in smart buildings and to SDNs on top of distribution poles. The control messages that are sent to SCNs (Control Packet to Building (CPB)) are
1. Control information regarding generation.
2. Control information regarding consumption.
3. Warning information in case of non-payment of bill or in case of crossing the consumption threshold.

The control messages that are sent to SDNs (Control Packet to SDN (CPSDN)) regarding the power switch off to small portion of the micro-grid in case of maintenance or emergency. The data latency and the data loss need to be minimized for CPB and CPSDN. The data latency for the control messages should not exceed one minute. It is assumed that all critical decisions are taken locally. MCS sends the control packet to Microgrid Relay (CPMGR) regarding the isolation from main grid. For CPMGR, Latency may not be a major factor because Micro-grid Relay (MGR) is placed so close to MCS. But data loss can result in wrong decision regarding the operational modes of the micro-grid.

Figure 9:
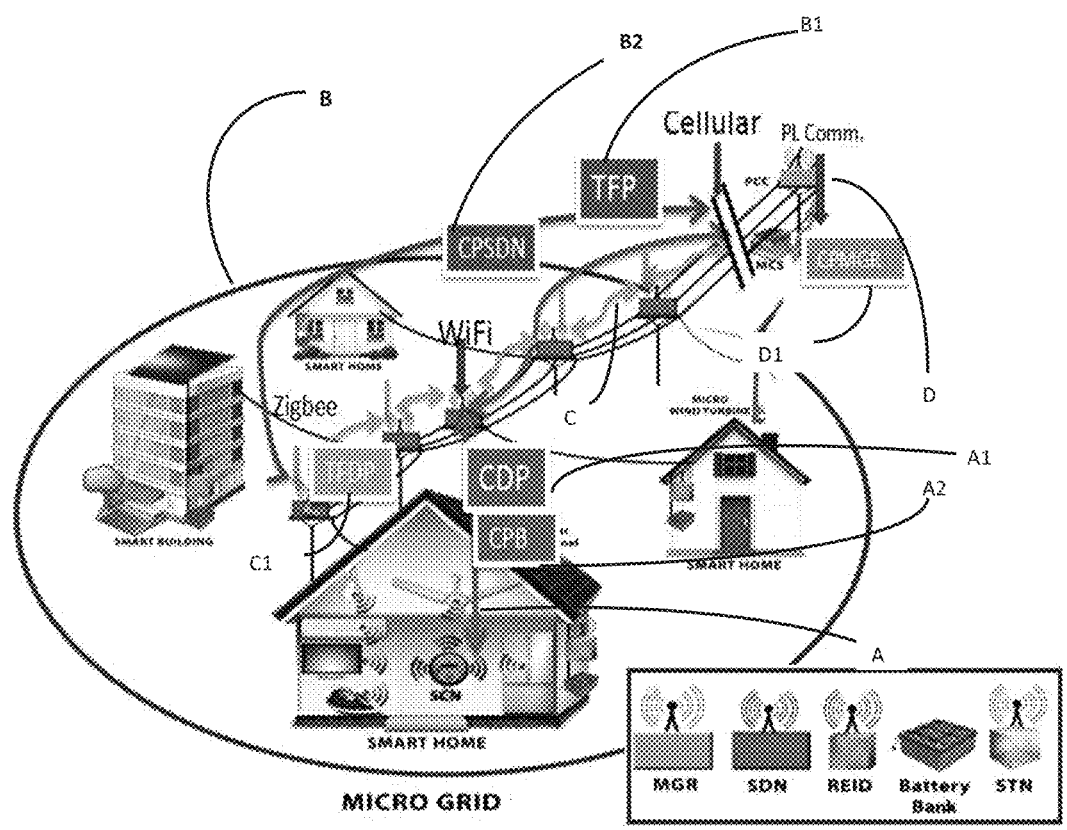
FIG. 9 depicts an optimum overlay of a communication network onto the smart distribution power grid in an embodiment of the invention.

FIG. 9 illustrates a working example of overlay communication network on the smart distribution power grid. As shown in FIG. 9 communication network, there are four means of communication namely means of communication for power and generation for transporting the information as packets between intelligent entities, means of communication for power theft, means of communication for power theft and line in fault, means of communication for sending control signal to isolate the grid. Each means of communication employs optimized communication technology selected from
WiFi, Zigbee and cellular or any other known technology to transmit data packets, according to the quality of service requirement of each data packet and the participant intelligent entities, and according to the type of information flow.

As depicted in FIG. 9, the means of communication for power and energy consumption (A) facilitates the transmission of consumer data packet (CDP) (A1) which is transmitted by SCNs (140) to MCS (110) via SDN (130) and it also facilitates the transmission CPB data packet (A2) which are control messages generated by MCS (110) to SCN (140). Similarly means of communication for power theft and line fault (B) facilitates the transmission of Theft Fault packet (TFP) (B1) information related to power theft and line fault generated by SDN (130) to MCS (110). Means of communication for power theft and line fault (B) also facilitates the transmission of control signal generated by SDN as a data packet CPSDN (B2) to MCS (110).

Another means of communication for isolation from main grid facilitates transmission of Control Packet to MGR (CPMGR) (C1). The means of communication for power theft and in line fault facilitates transmission of said TFDP data packet (D1) generated by the SDN (134) and said SCN (140) detection packet (D1) to next SDNs (133,132,131).

Table 1 depicts the full form of the packet types exchanged between intelligent entities inside a micro grid.

TABLE 1 depicts the full form of the packet types exchanged between intelligent entities inside a micro grid.

| Packet Type | Description |
| --- | --- |
| CDP | Consumer Data Packet. |
| TFDP | Theft-Fault Detection Packet. |
| TFP | Theft-Fault Packet. |
| CPB | Control Packet to Building. |
| CPSDN | Control Packet to SDN. |
| CPMGR | Control Packet to MGR. |

Choosing the Right Communication Technology for Micro-Grids: A Mathematical Approach:

Almost all micro-grid functionalities are required to be ensured by communicating location based electrical or physical parameters between the intelligent modules placed at specific locations of the micro-grid. The intelligent devices participating and the QoS requirement for the data packet communicating between the intelligent devices, to satisfy each functional requirement may vary. Different type of packets may be required to flow through each communication link in micro-grid. These communication links have to satisfy the Quality of Service (QoS) requirement of multiple data packet. Hence it is challenging to decide an optimal communication technology for each communication link in a micro-grid.

Developing nations need the micro-grid implementation severely as earlier mentioned. Also depending upon the size of micro-grid and the power grid structure, the number of major micro-grid components such as smart buildings, distribution poles, renewable energy generators and batteries can vary thereby the number of intelligent devices integrated to the micro-grid. Hence the micro-grid needs a cost-effective optimal overlay communication network. The mathematical model of the problem statement is explained below.

Let 'I_D.k,t' be the intelligent devices in a micro-grid, where '_' indicates the number of intelligent device and 't' indicates the type of intelligent device. Communication links have to be established between the different '_I_D.k,t' in order to achieve different functional requirements of micro-grid. Let '_Li,j_,_',' represent the direct link between the ith and jth intelligent Devices and 'Tcom' represents the available communication technologies. Based on the constraints of the packet types, 'Pti,j,_' flowing through each link and the micro-grid cost limit 'Cmg', a Tcom 'has to be chosen for each 'Li,j'.

Thus the problem definition can be formulated as:
1 Find:
Optimal (Tcom) for each Li,j_, subjected to:
a) Cmg
b) Constraints (Pti,); ∀t B. Optimization Formulations The micro-grid implementation should be cost-effective, as it is implemented in the rural areas. Hence the most critical parameter that needs to be minimized is the cost. For the CDP transmission, SCNs are the sources and MCS is the destination. Depending on the chosen technology for CDP transmission, the number of hops the packet takes will vary for a fixed sized micro-grid. Thus the optimization problem for the communication infrastructure for CDP transmission can be formulated as:

Minimize:

$$f(Cjg) = n \times lc + ct \times (Nr + 1) \times n = n \times \delta \qquad (1)$$

Subject to:

$$blink \times nscn \leq Bt \qquad (2)$$

$$ht = D/rt \qquad (3)$$

$$n = (ht - 1 + nscn) \qquad (4)$$

$$Nr + 1 \geq 1/(1 - p)^{ht} \qquad (5)$$

$$0 \leq p \leq 1 \qquad (6)$$

$$(Nr + 1)[llink + t + r] \times ht \times nscn \leq L \qquad (7)$$

The objective is to minimize the overall cost which includes the installation cost, communication cost and maintenance cost as shown in equation (1). Constraint in equation (2) restricts the flow bandwidth based on the chosen technology. Equation (3) gives the hop count which depends on the maximum distance between source and destination. Equation (4) gives the total number of intelligent devices in micro-grid those who have participated in the data packet transfer. Equation (5) limits the number of retransmissions according to the probability of link error and the hop count.

Constraint in equation (6) limits the value of probability of link error, 'p', between 0 and 1. Constraint in equation (7) restricts the packet latency considering the link latency, transmission latency and reception latency. Serial packet forwarding is taken for latency constraint in equation (7), as it gives the worst-case latency value. The optimization problem for the CDP communication link is a non-linear programming (NLP) problem, since the objective function and all the constraints are non-linear functions of the design variables. LINGO 14 software is used to solve the NLP problem. The TFDP transmission happens only between SDN and its direct descendants. For TFDP transmission, the hop count is one as it is peer to peer communication. Hence the packet latency for TFDP transmission is dependent on the number of descendants attached to a SDN. Thus the optimization problem for the communication infrastructure for TFDP transmission can be formulated:

Minimize:

$$f(Cjg) = n \times [1c + ct \times (Nr + 1) \times \delta] \quad (8)$$

Subject to:

$$blink \leq Bt \quad (9)$$

$$n = (nscn = nsdn) \quad (10)$$

$$Nr + 1 \geq 1/(1 - p) \quad (11)$$

$$0 \leq p \leq 1 \quad (12)$$

$$(Nr + 1)[llink + t + r] \times \mathrm{Max}(ndes) \leq L; ndes \leq n \quad (13)$$

The objective function shown in equation (8) minimizes the three components of the cost, namely installation cost, communication cost and maintenance cost. For localizing the power theft and line fault, the intelligent devices should be placed on each and every pole in the micro-grid as well as associated to each and every smart building. Hence the overall cost for the network for TFDP transmission is the total number of SCN and SDN (n) times the overall cost.

Constraint in equation (9) limits the flow bandwidth of the TFDP packet. Equation (10) gives the total number of SCNs and SDNs in the micro-grid. Constraint in equation (11) gives the number of packet retransmission limits depending up on the probability of link error. Equation (12) gives the range of variation of probability of link error. Constraint in equation (13) limits the TFDP packet latency which depends on the number of packet retransmissions (Nr) and the maximum number of descendants attached to a SDN (FGH*IJK$). The optimization formulation for TFDP packet is linear.

The TFP transmission happens between SDN and MCS, only when an anomaly such as power theft or line fault is detected at the SDN. Since TFP is a time critical data packet, the allowed packet latency is very small. Thus, the optimization problem for the communication infrastructure for TFP transmission can be formulated.

Minimize:

$$f(Cjg) = ht \times [1c + ct \times (Nr + 1) \times \delta] \quad (14)$$

Subject to:

$$blink \leq Bt \quad (15)$$

$$ht = D/rt \quad (16)$$

$$Nr + 1 \geq 1/(1 - p)^{ht} \quad (17)$$

$$0 \leq p \leq 1 \quad (18)$$

$$(Nr + 1)[llink + t + r] \times ht \leq L \quad (19)$$

An objective of the optimization formulation for TFP in equation (14) minimizes the overall cost which depends on the number of hops the packet takes to reach the MCS. The TFP packets are generated at SDNs when a theft or fault is detected.

Constraint in equation (15), limits the flow bandwidth. Equation (16) gives the hop count that the packet should take to reach the destination. Constraint in equation (17) limits the number of retransmissions of the packet which depends on the probability of link error and the hop count. Constraint in equation (19) restricts the packet latency which depends on the number of retransmissions and the hop count. As TFP is a critical packet, with minimum latency (less than one second) the packet has to reach MCS.

Since CPB transmission is in opposite direction to CDP transmission, same optimization formulation for CDP as shown from equation (1) to (7) is applicable for CPB transmission. Same way, the optimization formulation for TFP as shown from equation (14) to (19) is applicable for CPSDN transmission. As MGR is placed so close to MCS, any low range wireless technology is enough for CPMGR transmission. Power line communication (PL Commn.) is also a good option for CPMGR transmission.

TABLE 2 depicts the description of notations used in description.

| Notations | Description |
|---|---|
| δ | Maintenance cost for an intelligent device |
| ct | Cost of communication for a technology |
| Nr | Number of retransmissions |
| 1c | Installation cost of an intelligent device |
| llink | Data latency experienced in the link |
| T | Delay for transmitting a packet from an intelligent device |
| R | Delay for receiving the packet from an intelligent device |
| ht | Hop count for a communication technology |
| D | Maximum distance between source and destination |
| C | Maximum allowed communication cost for the data packet transmission |
| rt | Communication range based on the technology |
| nscn | Number of smart buildings in microgrid |
| p | Probability of error in communication link |
| blink | Flow bandwidth for the data packet |
| Bt | Maximum flow bandwidth of the technology |
| L | Latency allowed for the data packet to reach its end destination |
| ndes | Number of descendants to a SDN in microgrid |
| nsdn | Number of SDNs in microgrid |

Simulation Results:

A micro-grid with equal distribution pole to pole distance which is 40 m have been considered. The maximum distance between a smart building or SCN and the SMCS is taken as 240 m. The length of Consumer Data Packet (CDP) generated by each smart building is taken as 10 kbps. For Zigbee technology the connectivity range is taken as 40 m, for WiFi the connectivity range is taken as 120 m and for cellular it is taken as 10 Km. The flow bandwidth for Zigbee is taken as 250 kbps, for WiFi is taken as 11 Mbps and for cellular is taken as 5 75 Mbps. The maximum latency allowed for CDP is one hour.

The variation of cost with respect to the probability of error, the number of smart buildings or SCNs and the maximum distance between source and destination for the three communication technologies such as Zigbee, WiFi and cellular for each type of packet have been analyzed.

Figure 10:
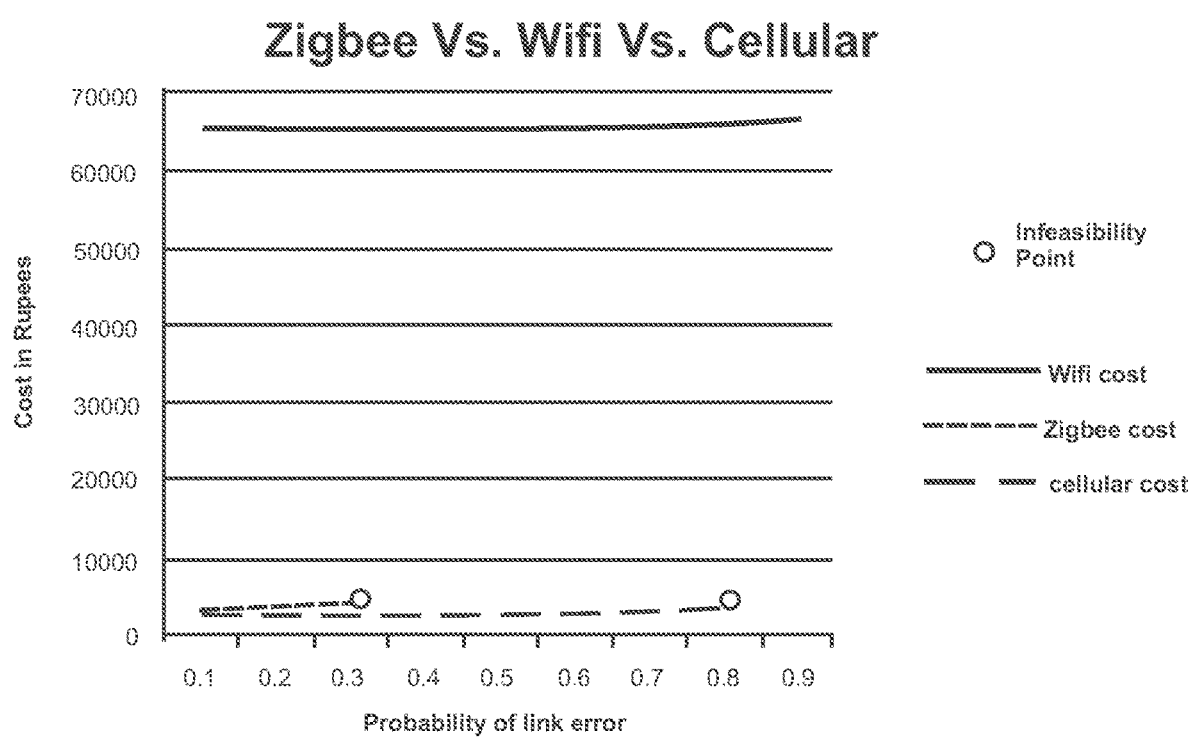
FIG. 10 is a graph of cost vs probability of link error for different technology for CDP transmission in an embodiment of the invention.

FIG. 10 shows variation of cost with different probability of link error for Zigbee, WiFi and cellular technologies for CDP. The slow variation of cost with respect to comparably large variation in probability of link error (p) is due to the fact that the variation in 'p' affects only the communication cost component of the overall cost. This may pose a question on the inclusion of communication cost as a component in the overall cost as it is less, compared to other components especially installation cost. The installation cost is only a one-time cost whereas the communication cost will increase as the increase in the number of data packet transmission. Hence it is required to include the communication cost as well in the overall cost for CDP transmission network.

For simulation, the micro-grid is considered with maximum of 25 smart buildings. Zigbee and WiFi have less cost compared to cellular, but they reach the infeasibility point as probability of link error goes towards one. In each of the graphs, the infeasibility point represents the violation of one of the constraints in the optimization formulation. Hence after reaching infeasibility point, the technology for the packet transmission is not used. Zigbee is used until the probability of link error reaches 0.3 and WiFi is used until the probability of link error reaches 0.8. The cost is less for WiFi compared to Zigbee and cellular. Thus, analysis of the cost verses probability of link error for CDP gives WiFi as a better option for CDP transmission.

Figure 11:
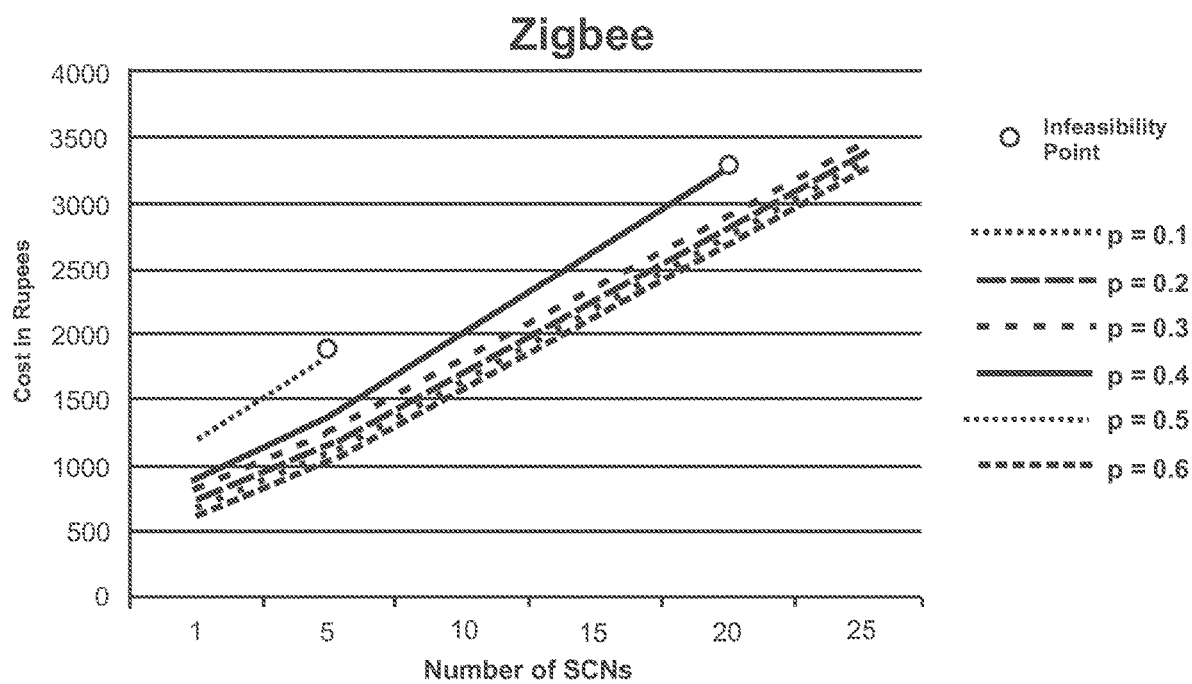
FIG. 11 is a graph of cost vs number of SCN in the micro-grid with different link error probability for CDP transmission using Zigbee in an embodiment of the invention.
Figure 12:
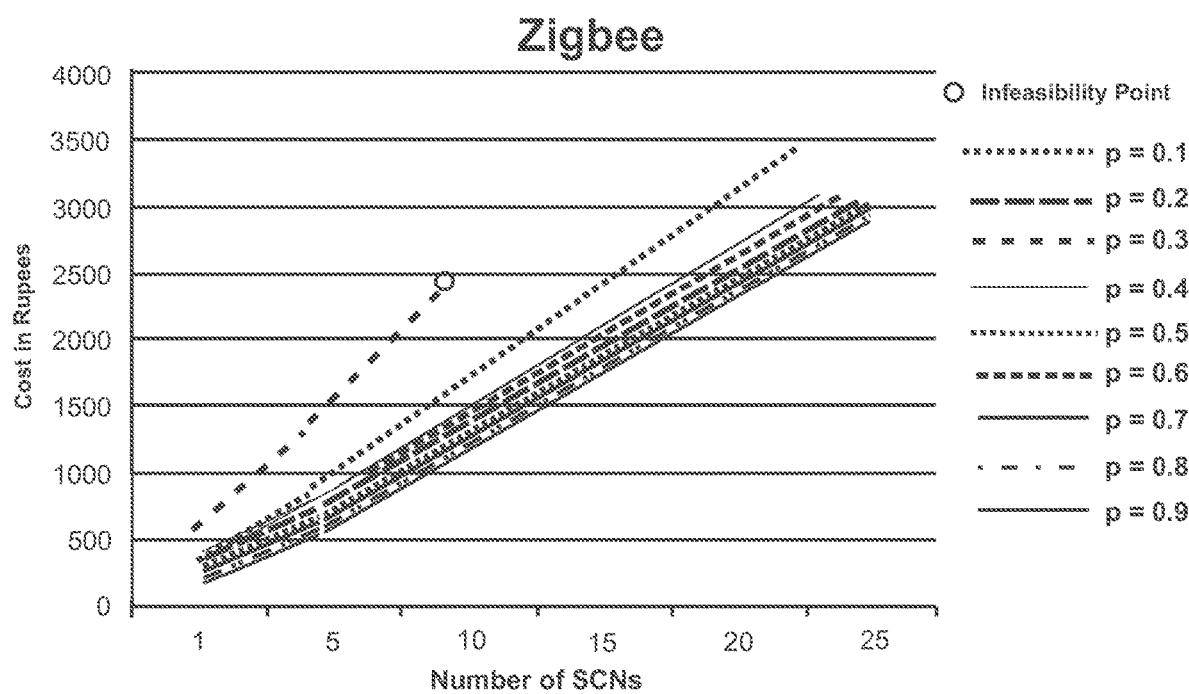
FIG. 12 is a graph of cost vs number of SCN in the microgrid with different link error probability for CDP transmission using WiFi in an embodiment of the invention.

FIG. 11 and FIG. 12 show variation in cost with increase in number of smart buildings or SCN in microgrid for different probability of link error in case of CDP transmission with Zigbee and WiFi respectively. With Zigbee, microgrid having probability of link error, 0.4, can accommodate only up to twenty smart buildings and micro-grid having probability of link error, 0.5, can accommodate only up to five smart buildings. When the probability of link error is 0.6, micro-grid can accommodate only one smart building.

With WiFi, micro-grid can accommodate 25 smart buildings when the probability of link error is between 0 and 0.8. If the probability of link error is 0.9, then the micro-grid with WiFi can accommodate only 10 smart buildings for CDP transmission. Thus, to accommodate more smart buildings with less communication network cost, WiFi is the good option for CDP transmission, if the probability of link error is not very close to one.

Figure 13:
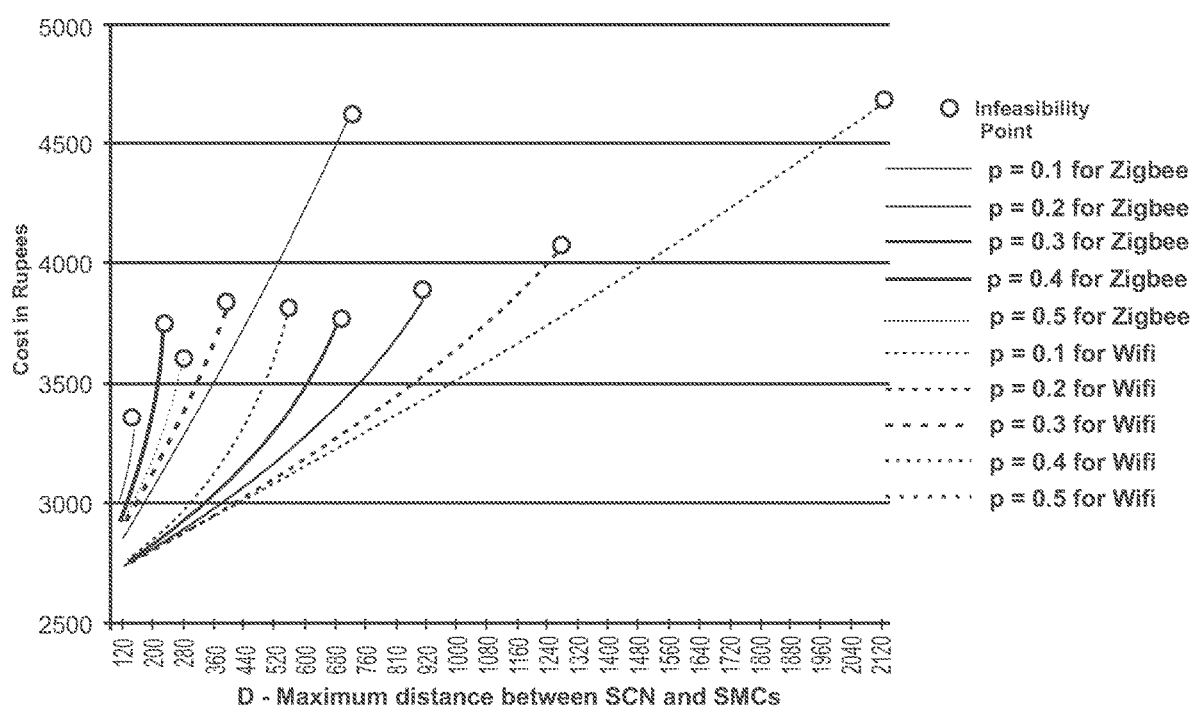
FIG. 13 depicts cost vs maximum distance between SCN and MCS in the micro-grid with different link error probability for CDP using Zigbee and WiFi in an embodiment of the invention.

The variation of cost with respect to the variation of maximum distance between source (SCN) and destination (MCS), which is represented as 'D', for different probability of link error for CDP transmission is shown in FIG. 13. For the same range of D, the cost is much higher for Zigbee than WiFi. Moreover, Zigbee gives infeasibility point faster than WiFi for the same probability of link error. Hence WiFi is the better option for CDP transmission among the two other communication technologies namely
Zigbee and cellular.

The TFDP transmission is happening in one hop between any of the SCNs in micro-grid and its descendants. The maximum allowed packet latency for TFDP is taken as one minute. The optimization formulation is solved for TFDP provided in equations from (8) to (13) for different maximum number of SDNs in micro-grid and for different probability of link error. Since the TFDP transmission is only one hop packet transmission and the communication network cost is preferred to be less, cellular for TFDP transmission is not considered. FIG. 13 shows the variation of cost with the
variation of maximum number of SDNs in the micro-grid for TFDP transmission using both WiFi and Zigbee. They both give same plots for different probability of link error and they both are infeasible when the probability of link error exceeds 0.7.

Figure 14:
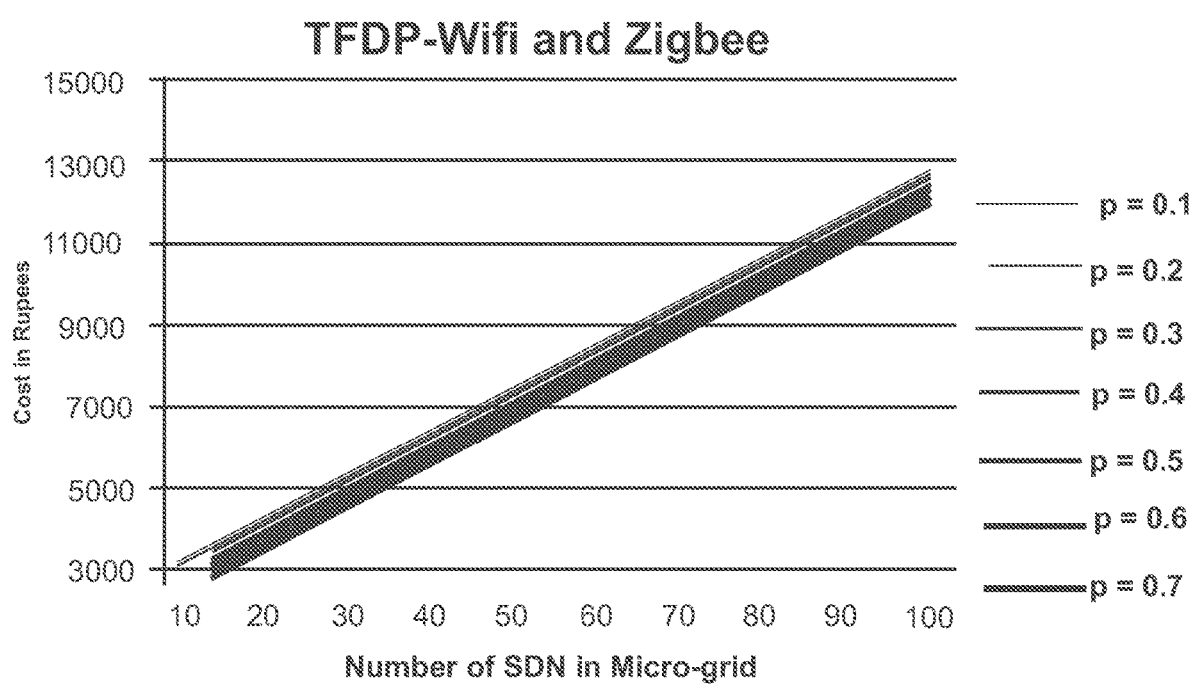
FIG. 14 is a graph of cost vs number of SDNs in micro-grid with different link error probability for TFDP using Zigbee and WiFi in an embodiment of the invention.

FIG. 14 is a graph of cost vs number of SDNs in micro-grid with different link error probability for TFDP using Zigbee and WiFi in an embodiment of the invention.

Figure 15:
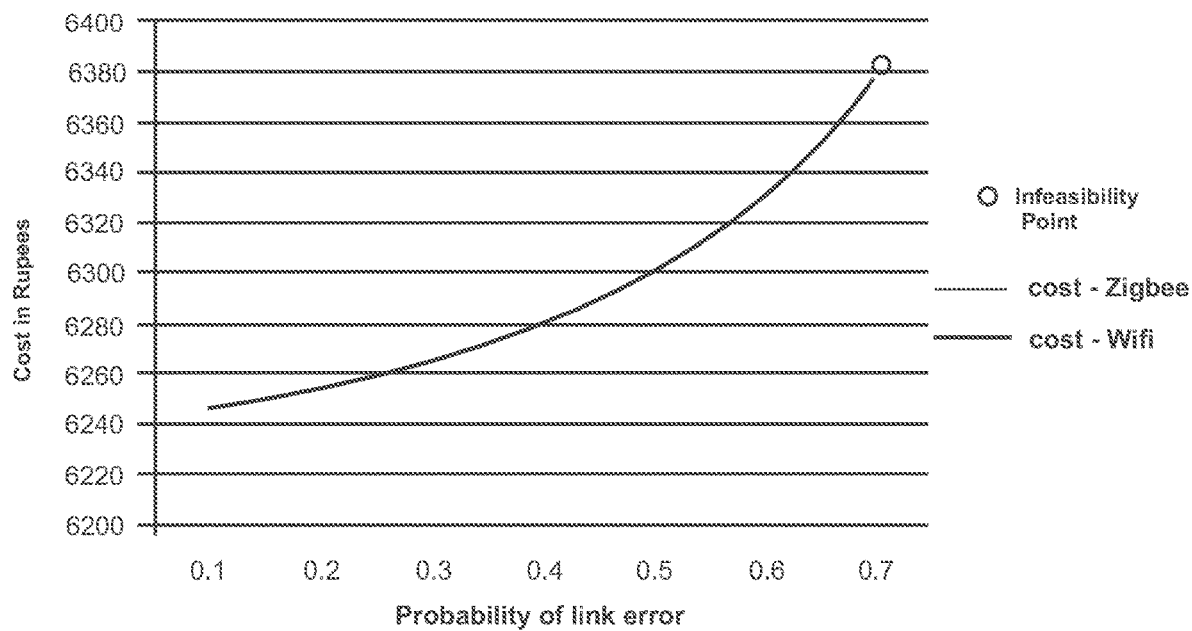
FIG. 15 is a graph of cost vs probability of link error for TFDP using Zigbee and WiFi in an embodiment of the invention.

FIG. 15 shows the variation of cost with increase in probability of link error for both Zigbee and WiFi. Both Zigbee and WiFi gives same cost for TFDP transmission, therefore another parameter of power consumption is considered for the selection of communication technology for TFDP transmission. In case of TFDP, the communication devices are placed in each and every distribution pole and also in each smart building. All those intelligent devices are powered by the micro-grid. If they are continuously sending the TFDP, then the energy consumption of intelligent devices increases and affects the sustainability of the micro-grid. Therefore, to choose between Zigbee and WiFi for TFDP transmission the power consumption is selected as a parameter. Zigbee is the low power consuming technology than WiFi. Thus, Zigbee is a good option for TFDP transmission.

Theft-Fault Packet (TFP) is sent from any SDN of the micro-grid to MCS, upon detecting a theft or a fault. The packet latency that the TFP affords is very small, as the packet contains the critical data. The packet latency for TFP is taken as 5 seconds for simulation of the equation from (14) to (19). FIGS. 10, 11 and 12 show the variation of cost with variation of maximum distance between the source and destination for TFP transmission using Zigbee, WiFi and cellular respectively.

For TFP transmission using Zigbee, cost varies linearly with increase in the probability of link error as shown in FIG. 15. At around 160 meters of 'D', infeasibility point has reached in case of ideal channel for TFP transmission using Zigbee. At infeasibility point, the packet latency constraint has been violated. Infeasibility point has reached for p=0.1, at around 120 meters of 'D'. Infeasibility point has reached for p=0.2 and p=0.3, at around 80 meters of 'D'. Infeasibility point has reached for p=0.4, after 'D' exceeds 40 meters. Zigbee is infeasible for TFP transmission, when probability of link error exceeds 0.5.

Figure 16:
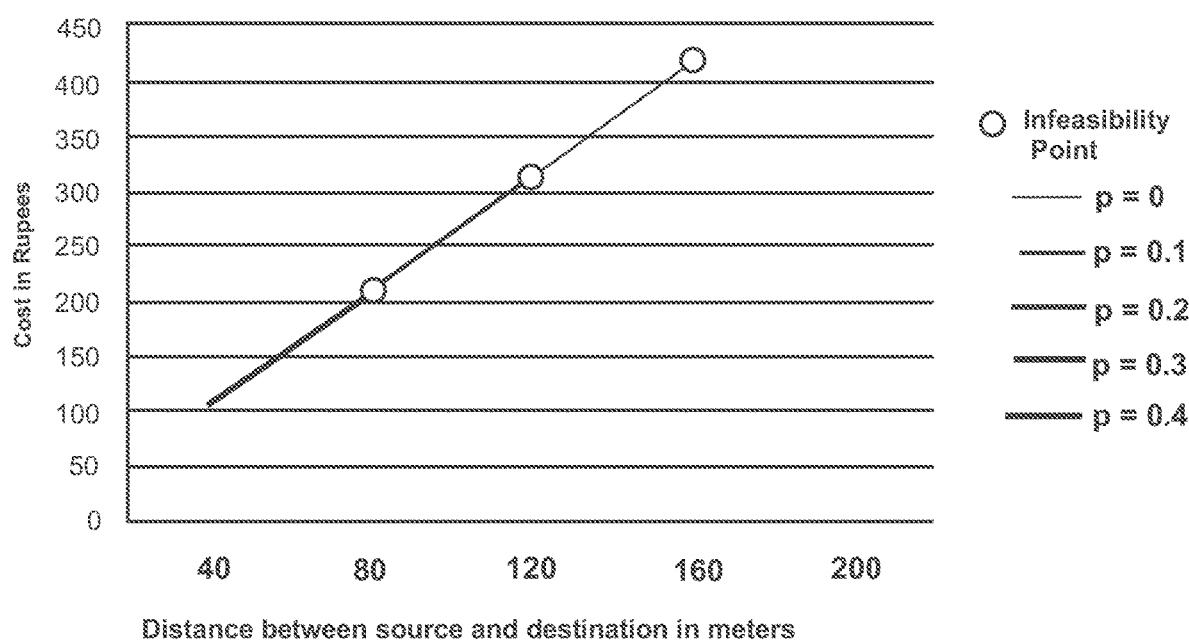
FIG. 16 is a graph of cost vs maximum distance between source and destination for the TFP using Zigbee in an embodiment of the invention.
Figure 17:
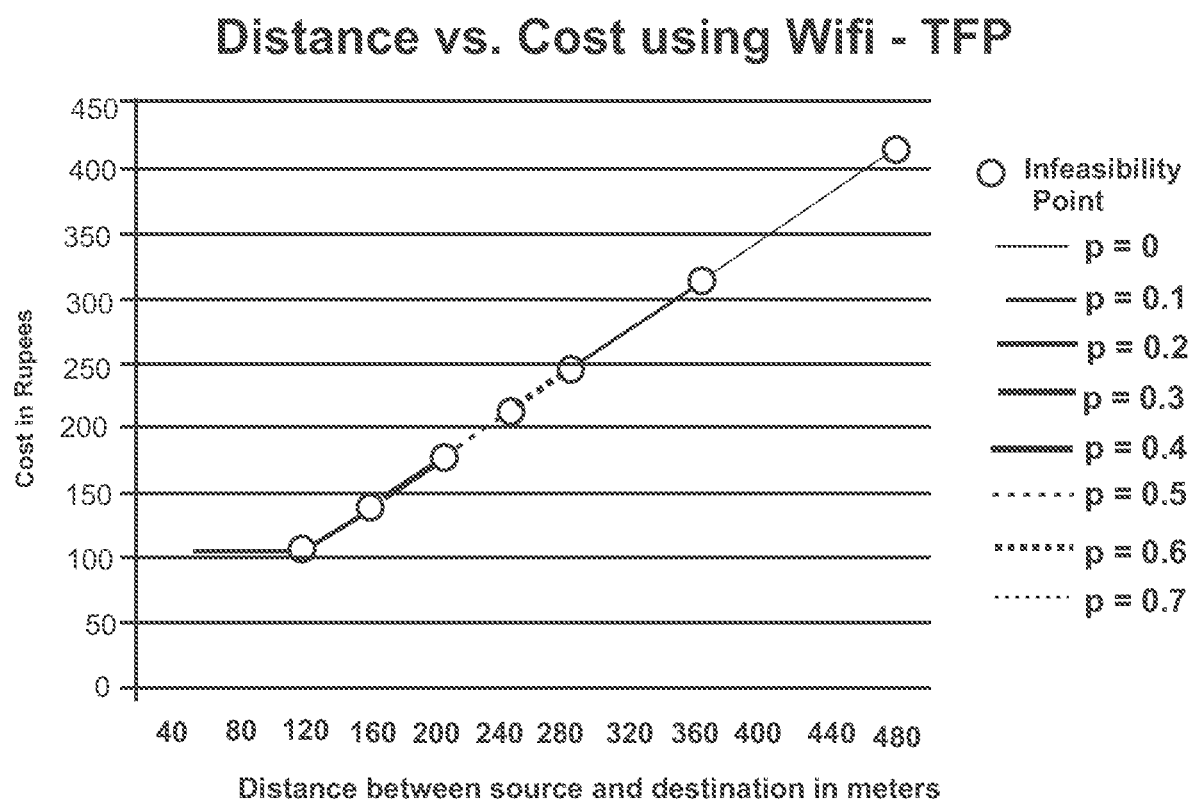
FIG. 17 is a graph of cost vs maximum distance between source and destination for the TFP using WiFi in an embodiment of the invention.
Figure 18:
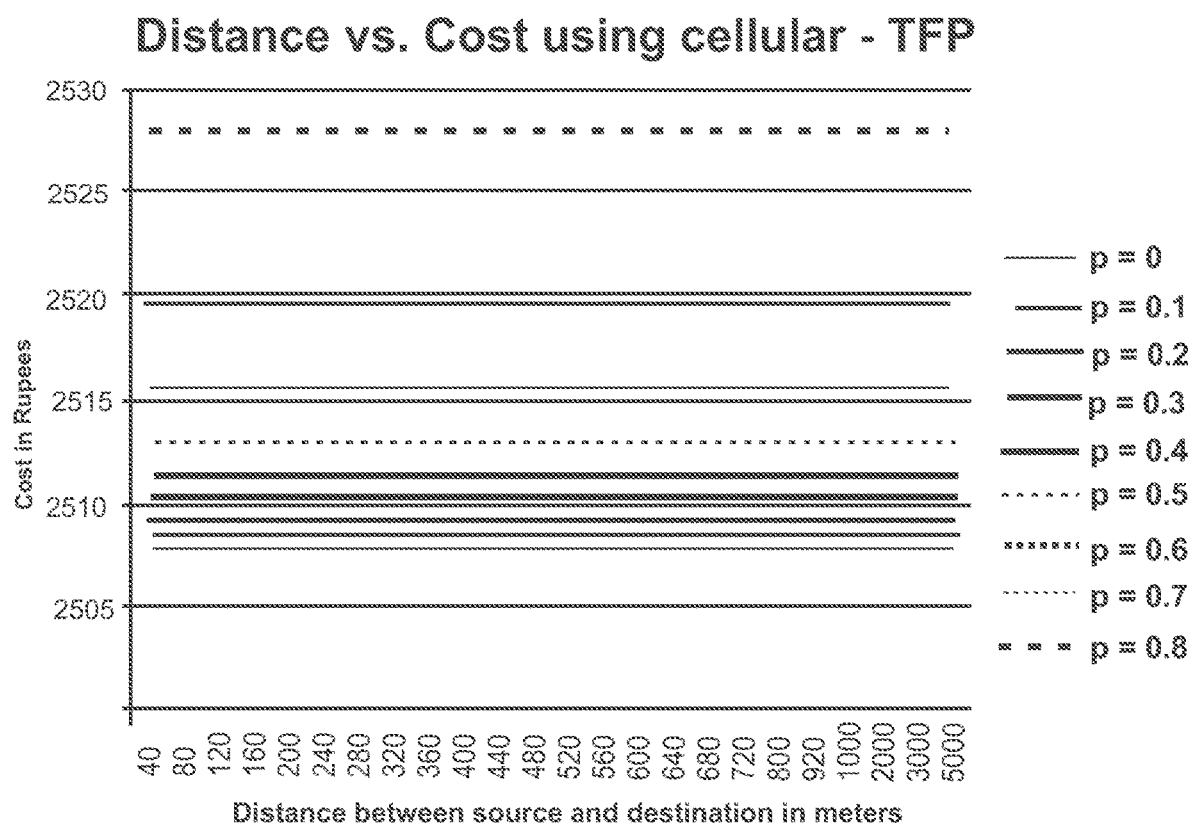
FIG. 18 is a graph of cost vs maximum distance between source and destination for the TFP using cellular in an embodiment of the invention.

WiFi becomes infeasible for TFP transmission, when the probability of link error exceeds 0.8. Infeasibility point has reached at around 480 meters when the probability of link error is zero as shown in FIG. 16. Infeasibility points are found at around 400 meters, 320 meters, 240 meters, 200 meters, 160 meters, 120 meters for the probability of link errors, p=0.1, p=0.2, p=0.3, p=0.4, p=0.5, p=0.6 and p=0.7 respectively. For TFP transmission using cellular, we got constant cost for each probability of link error from p=0 to p=0.8. Cellular becomes infeasible when the probability of link error exceeds 0.8 as shown in FIG. 17. Thus, cellular technology is a better option for TFP transmission, if 'D' is large. FIG. 18 is a graph of cost vs maximum distance between source and destination for the TFP using cellular in an embodiment of the invention.

Test Results Based on Simulation Results

Based on the simulation results and discussions presented in the aforementioned section, some conclusions are derived regarding the optimal communication technologies for each packet. For CDP, WiFi is the best candidate for the probability of link error values ranging from 0 to 0.5 with respect to the overall cost. Also, it can accommodate more SCNs or smart buildings compared to Zigbee for even larger link error probabilities. For TFDP, WiFi and Zigbee give same cost values for different link error probabilities ranging from 0 to 0.7. When the link error probability exceeds 0.7, both Zigbee and WiFi hit the infeasibility point. In that case we have introduced another parameter called low power consumption of the technology and recommended Zigbee as the candidate for the TFDP transmission.

The best communication technology option for TFP is Zigbee, if the distance between source and destination are within 160 meters with zero link error probability, within 120 meters with 0.1 link error probability, and within 80 meters with 0.2 and 0.3 link error probabilities. The best communication technology option for TFP is WiFi, if the source to destination distance is within 440 meters with zero link error probability, source to destination distance is within 360 meters with 0.1 link error probability, source to destination distance is within 280 meters with 0.2 link error probability, source to destination distance is within 240 meters with 0.3 link error probability, source to destination distance is within 200 meters with 0.4 link error probability, source to destination distance is 160 meters with 0.5 link error probability, source to destination distance is 120 meters with 0.6 and 0.7 link error probabilities. WiFi becomes infeasible for TFP transmission when the link error probability exceeds 0.7. Cellular the best option for TFP transmission if cost is not a matter for this packet transmission. As the TFP contains critical data, cellular is the good candidate for the TFP transmission.

For the CPB transmission, the same technology used for CDP transmission can be used and for CPSDN, the same technology used for TFP transmission can be used. For CPMGR, any short-range communication technology is a better option. As wireless communication technologies experience link unreliability's, power line communication is a good candidate for CPMGR transmission. FIG. 18 shows a better idea on the optimal communication technologies that can be used for different data packets transmission in micro-grid.

It will be apparent to one with skill in the art that the power theft detection control system of the invention may be provided using some or all of the mentioned features and components without departing from the spirit and scope of the present invention. There may be many alterations made in the descriptions without departing from the spirit and scope of the present invention.

Cost Optimal Communication Architecture

There have been notable changes in power grids since inception of the concept of smart grids. There is, therefore, a need for meticulous study of the dynamic growth of power grids in the generation, transmission and distribution sectors, as well as emerging variations in real-time monitoring and management of a grid. To achieve this and to ensure a self-sustainable grid, information regarding power grid attributes must be appropriately conveyed to exact destinations. Therefore, flawless design of overlay communication networks for smart grids is exceedingly significant. Instrumenting the entire grid with intelligent communication devices is believed to be prohibitively expensive. Thus, a cost optimal model is necessary for selection of essential cardinality of intelligent communication devices required for data transmission by ensuring Quality of Service (QOS) metrics. In disclosure below, an overview of smart distribution grid architecture with networks of microgrids and the need of hybrid communication for the intra-microgrid communication is presented. Then a cost optimal model which offers optimal combination of technologies for intelligent devices in a hybrid communication overlay network is described. The formulation developed considers QoS metrics such as data packet latency, bandwidth requirement, link reliability, packet drops and communication range of the technology for the derivation of a cost optimal solution. A simulation study reveals the cost optimal combination of technologies for varying probability of link unreliability using communication technologies such as ZigBee, Wi-Fi and Cellular.

I. INTRODUCTION

Sustainable development of any modern community requires electrical infrastructure. Improving efficiency and reducing cost motivates evolution in power grids, which is a subject of this teaching and disclosure. This evolution has led to development of smart grids. A smart grid integrates sensing, processing, communication and control facilities to almost all grid entities. The inventors believe "smartness" in a grid lies in proper delivery of sensed information from any source entity to a destination entity, to make correct decisions at appropriate times. This requires decorous design and formation of an overlay communication network for the power grid.

Wireless communication technologies offer remote control and monitoring of a power grid without incurring any cabling cost as that of wired communication technologies. Various wireless communication technologies, including Cellular, Wi-Max, Wi-Fi, LTE, ZigBee, and Bluetooth can be used or smart grid communications. It is believed that a hybrid communication scheme for smart grid application may be less expensive than a single scheme using an economical cost model based on a real implementation of smart metering infrastructure. Therefore, choosing appropriate communication technologies which concurrently offer reliability, security and the required levels of Quality of Service (QOS) metrics such as bandwidth, latency and packet losses proves an important challenge in design of communication architecture for a smart distribution grid.

The scale of a modern distribution grid means that controlling and managing information flow of the entire grid might be exorbitantly challenging. This may be seen by operating the existing distribution grid as a network of microgrids. A smart distribution grid with distributed microgrid architecture essentially depends on taut linkage between the cyber layers and the physical layers, so ICT systems are core elements of microgrids.

A smart distribution grid furnished with intelligent two-way data communication can generate immense data that needs to be transferred and processed for useful information for intelligent decision making. Depending on different functionalities achieved for the smart distribution grid, intelligent communication devices need to be positioned throughout the grid. However, instrumenting the entire smart distribution grid with these intelligent devices is known to be prohibitively expensive. Thus, a cost optimal model is necessary for selection of an exact quantity and mix of intelligent devices for the data transmission with required QoS metrics.

In the following disclosure an overview is presented of smart distribution architecture with a network of microgrids and a need of hybrid communication for the intra microgrid communication. Then an optimization model is formulated, which provides cost optimal combinations of technologies for intelligent devices for the hybrid communication overlay network. The formulation developed considers QoS metrics, such as data packet latency, bandwidth requirement, link reliability, packet drops and communication range of the technology for derivation of the cost optimal solution.

A simulation study determines the cost optimal combination of technologies for varying probability of link unreliability using the communication technologies such as Zig-Bee, Wi-Fi and Cellular.

Section II describes architecture of a smart distribution grid with a communication overlay network. Section III describes the need of hybrid communication architecture for smart distribution grid, and Section IV presents a problem description and a cost optimal hybrid communication model. Section V presents simulation results and discussions. Section VI is a conclusion.

II. ARCHITECTURE OVERVIEW

Figure 19:
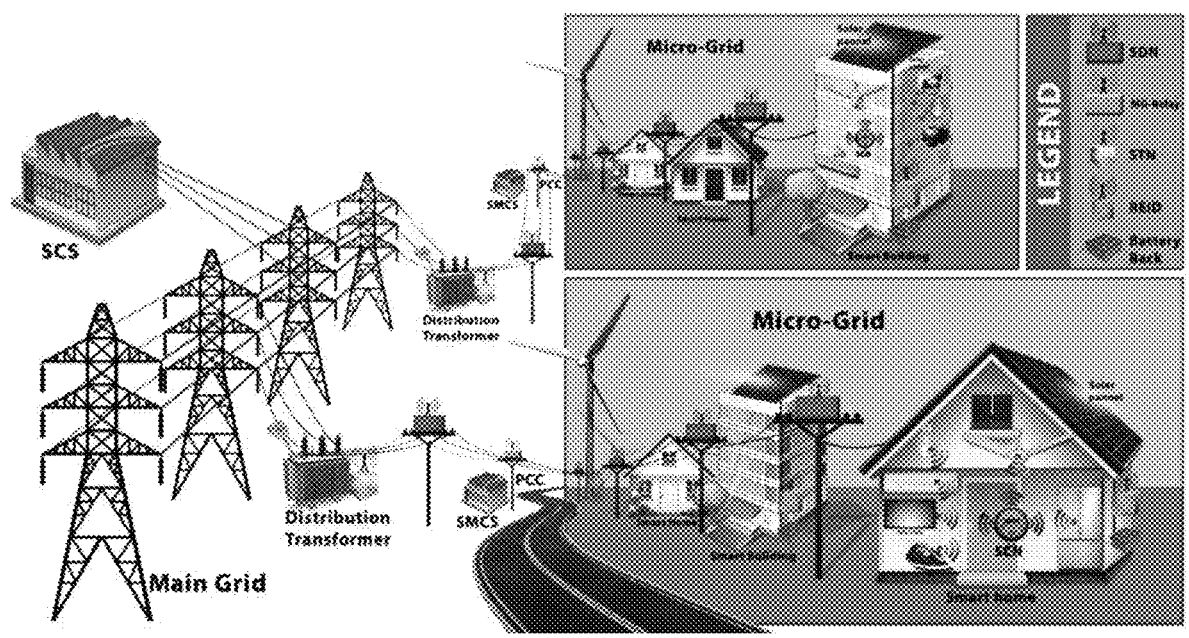
FIG. 19 is an architecture diagram for one embodiment of the present invention.

In this section an overview of the smart distribution grid architecture as a network of microgrids, as previously described, is presented. In order to facilitate conformance to functional requirements of the microgrid, intelligent devices such as Smart Consumer Nodes (SCN), Smart Distribution Nodes (SDN), Renewable Energy Intelligent Devices (REID), Smart Transformer Nodes (STN), Microgrid relays (MG-Relays) and a Microgrid Controlling Station (MCS) are integrated with the power grids as shown in FIG. 19.

Basically, all sets of nodes presented in the smart distribution architecture are furnished with a sensing and actuator module, a computing module and a communication module. This allows a designer to choose between two options. One option is to design a generic intelligent device with all the features of all intelligent devices, so that the same can be configured as multiple intelligent devices. An alternative option is to design unique intelligent devices that fulfill specific different functionalities. Ideally, to accomplish all the functional requirements, numerous intelligent devices need to be deployed in different locations within a grid. However, the number of devices can be reduced by acquiescing the overall performance or by retracting some of the microgrid functionalities. Therefore, designers have freedom to choose from different options based on the performance requirement and the cost of the system. The performance verses cost trade-off analysis determines the number of intelligent devices in smart distribution architecture.

Powering of the intelligent devices and their energy consumption is a matter to be studied. Energy drawn by the microgrid communication and controller infrastructure is affected by the specifications of the module chosen for the design of the intelligent devices. For example, if Raspberry Pi is used, then the power consumption varies from 0:2 W to 1:2 W based on the selected Pi model. If the module operates for 1 hr, the energy consumption varies from 0:2 Wh to 1:2 Wh. A renewable energy source or batteries or the grid itself can power the intelligent devices. Selection of either renewable energy source or batteries for powering will increase the cost of the microgrid communication infrastructure, since the cost of the powering technologies chosen for intelligent devices will add on the entire infrastructure cost. In this application it is assumed that the intelligent devices are powered from the grid itself. The exploration of the cost optimal number of intelligent devices without compromising the required data communication attributes diminishes the overall energy consumption of communication infrastructure to a great extent.

III. NEED OF HYBRID COMMUNICATION ARCHITECTURE FOR THE SMART DISTRIBUTION GRID

An important goal of the overlay communication network for the smart distribution grid architecture shown in FIG. 19 was to ensure reliable and real-time communication of information about different entities in the distribution grid. This communication is necessary for smooth working of each microgrid and real-time decision making of different aspects in the smart distribution grid. Since grid entities are spatially distributed and highly location dependent, the overlay communication infrastructure should be location dependent. Location dependent environment factors affect communication link unreliability of the communication infrastructure. For that reason, single communication technology alone will not be able to deliver data packets with varying Quality of Service (QOS) requirements from diverse power grid entities. This fact motivates usage of a combination of communication technologies for the optimal communication architecture of smart distribution grid.

Figure 20:
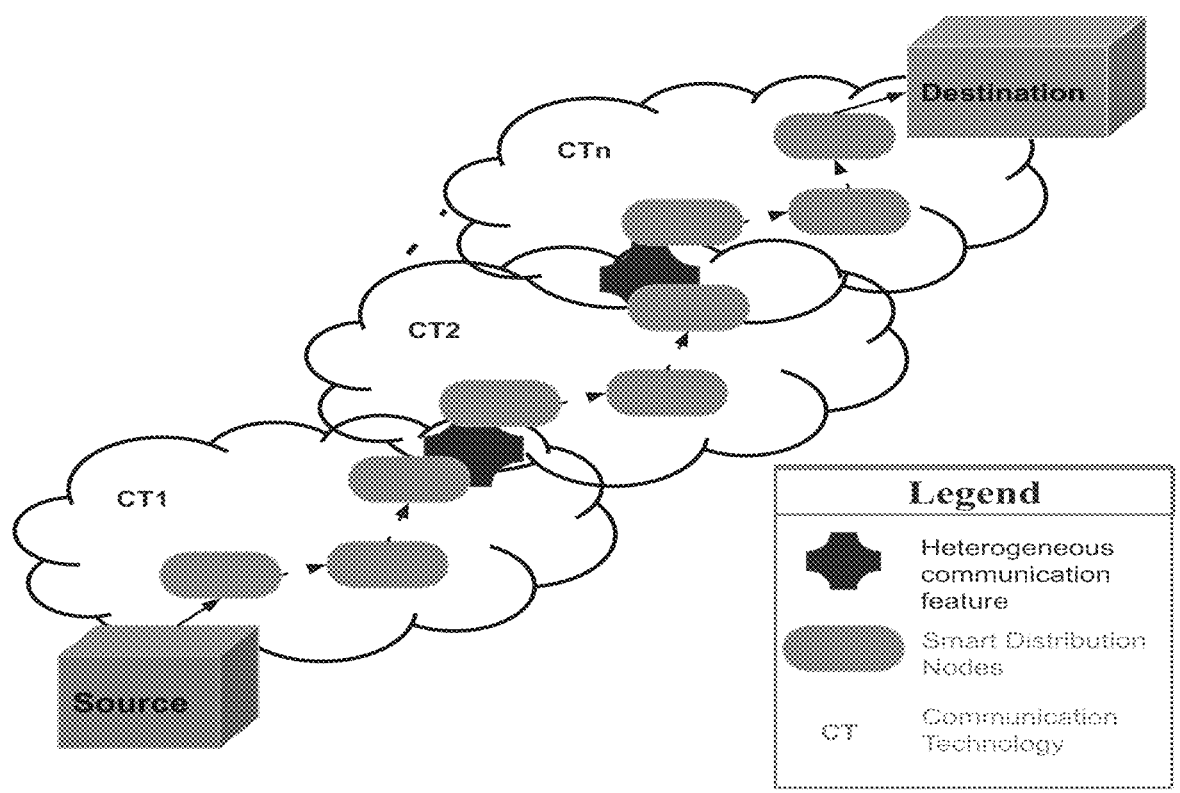
FIG. 20 is a diagram illustrating data communication in an embodiment of the invention.

Most research in this area recommends a heterogeneous communication architecture with different communication technologies and their seamless integration. In heterogeneous communication architecture, all the communication devices are capable to communicate with each other irrespective of the technologies, such as ZigBee, WiFi, Cellular, Wi-Max, Power Line Communication (PLC) employed in such devices. Incorporation of heterogeneous communication features in all the devices results in increase of overall cost of the communication network. This fact motivates the need of a hybrid communication architecture for smart distribution grid wherein the heterogeneous communication feature is required only in places where a technology change happens in the network of intelligent devices as shown in FIG. 20.

The inventors believe a hybrid communication architecture is more suitable for the smart distribution grid because:
1) The smart distribution grid should be active under extreme environmental conditions. In such circumstances, the present technology deployed may or may not work. If there are a variety of technologies, the chance of successful data delivery is higher.
2) The usage of heterogeneous communication features in a limited number of intelligent devices, where there is a technology transition, will lower the total cost of the communication network for smart distribution grid.

IV. COST OPTIMAL MODEL

A. Problem Description

As was discussed in the previous section III, the hybrid communication model chooses the combinations of communication technologies to deliver data packets from source to destination. For instance, a microgrid of the smart distribution grid transmits data packets regarding the energy consumption from SCNs in different smart buildings to the MCS. Therefore, based on the network diagram shown in FIG. 20, SCNs are sources and MCS is the destination. The data packets generated from an SCN are termed Consumer Data Packet (CDP). In the middle of this communication different SDNs, that are deployed to achieve other microgrid functionalities such as power theft detection and line fault detection, can act as intermediate nodes to relay the data packets from SCNs.

Since the power grid in the distribution side is radial, the communication network will also follow radial topology to accomplish all the microgrid functional requirements. If there are communication technologies $CT_1, CT_2 \ldots CT_n$ and set of SDNs or intermediate nodes $SDN_1, SDN_2 \ldots SDN_n$ under each communication technology, then the problem of cost optimal hybrid communication model can be defined as: Find out the technology combinations of intermediate nodes, $n_t = n_1; n_2 ::: n_j$ with minimal cost subject to the QoS parameters of each technology and QoS requirement of the data packet generated by SCN of the smart building.

Where n1 represents the number of intermediate nodes with communication technology $CT_1$, n2 represents the number of intermediate nodes with communication technology $CT_2$ and so on. The total number of intermediate nodes with different technologies required for successful data packet delivery from source to destination is represented by $n_t$.

B. Cost Optimal Hybrid Communication Model

For solving the problem described in the previous section, a non-linear optimization model is formulated which gives the optimal combination of intelligent devices with different technologies with minimum cost. If we have 'k' number of technologies and we need to operate the communication infrastructure for 'Y' years, the detailed model, presented below, provides the optimal combination of intelligent devices with different technologies at a minimum cost.

$$\text{Minimize}: C = \sum_{t=1}^{k} \tag{1}$$

$$\left[ n_t \times (I_c(t) + (\delta_t \times Y \times 12) + (C_t \times Y \times P_f \times (N_r + 1))) + Y \times (C_i(t))^{(n_{SCN} + n_t)} \right]$$

$$\text{Subject to:} \sum_{t=1}^{k} [n_r - 1] \times r_t \times (1-p)^2 \geq D \tag{2}$$

$$N_r + 1 \geq 1/(1-p) \tag{3}$$

$$\sum_{t=1}^{k} [N_r + 1 \times (l_{link} + t + r) \times n_t] \leq L \tag{4}$$

$$\sum_{t=1}^{k} [n_t - 1] \times p \leq Rel \tag{5}$$

$$n_t \geq 0 \tag{6}$$

$$0 \leq p < 1 \tag{7}$$

$$\text{Max}(b_{link}) \leq \text{Min}(B_t) \tag{8}$$

The objective is to minimize the sum of the overall costs which include installation, communication, maintenance, and information capacity requirement for different technologies as shown in equation 1. The information capacity requirement cost is a measure of the information holding capacity of each technology and the efficiency to aggregate the data from different smart buildings and the intermediate devices. This cost exponentially decreases with increase in the intermediate devices, since more devices handle the information capacity requirement of the whole system and data aggregation. Constraint in equation 2 indicates the variation of connectivity range according to the variation of probability of link unreliability. This constraint ensures the single hop or multi hop connectivity from the source to the destination.

The expression in equation 3 specifies the number of re-transmissions according to the probability of link unreliability. Constraint in equation 4 restricts the packet latency with regard to the link latency, transmission latency and reception latency for the combination of intelligent devices with different technologies. Constraint in equation 5 restricts the increase in the number of hops, with the increase in the link unreliability, by the introduction of a reliability factor 'Rel'. Equation 6 presents the bounds for the number of intelligent devices. Constraint in equation 7 limits the value of probability of link unreliability, 'p', between 0 and 1. Constraint in equation 8 limits the maximum flow bandwidth of the packets within the minimum flow bandwidth of the technology combination.

Table I gives a list of notations used in this application and its descriptions.

TABLE I

| | |
|---|---|
| $\delta_t$ | Maintenance cost for an intelligent device |
| $C_t$ | Cost of communication for a technology |
| $N_r$ | Number of re-transmissions |
| $I_c$ | Installation cost of an intelligent device |
| $I_{link}$ | Data latency experienced in the link |
| t | Delay for transmitting a packet from an intelligent device |
| | Delay for receiving the packet from an intelligent device |
| $r_t$ | Communication range based on the technology |
| Y | Number of years |
| $P_f$ | Frequency of packet transmission |
| $n_t$ | Number of intelligent devices with technology 't' |
| $C_i(t)$ | Cost of information capacity requirement for technology 't' |
| $n_{SCN}$ | Number of smart buildings in microgrid |
| $n_t$ | Number of intelligent devices with technology 't' |
| p | Probability of communication link unreliability |
| $b_{link}$ | Flow bandwidth for the data packet |
| $B_t$ | Maximum flow bandwidth of the technology |
| L | Latency allowed for the data packet to reach its end destination |
| Rel | Reliability factor |

C. Recursive Algorithm for Cost Optimal Combination of Communication Technology (RACOCCT) for Smart Distribution Grid The cost optimal hybrid communication model described in the previous section will give the cost optimal combination of technologies for the longest distant branch of the power grid. However, a radial distribution grid has many bifurcations from the main branch of the grid. For such a radial distribution grid topology, a recursive algorithm can find the cost optimal combination of intermediate intelligent devices. The pseudocode for RACOCCT is shown in algorithm 1:

| Algorithm 1 RACOCCT |
|---|
| 1:     Input 1: PGT; Y ; Pf, L;B |
| 2:     Input 2: $CT_t$ for t = 1; 2 : : : k; p; Rel |
| 3:     Output: $n_t$ for t = 1; 2 : : : k; C |
| 4:     Get the longest Branch (LB) of PGT |
| 5:     function FINDIDC(Input 2) |
| 6:        for $CT_1$; $CT_2$..... $CT_t$, do |
| 7:           function GETCOMMDET($CT_t$) |
| 8:           end function |
| 9:        end for |
| 10.    Run optimization model from eqn. 1 to eqn.8 |
| 11.    Return (C, $n_t$ for t = 1; 2 : : : k) |
| 12.    Populate Branch{ for j= 1; 2 : : : l and for i = 1,2....h |
| 13:    for i and j do |
| 14.        if Branch{ !=0, then |
| 15.           function FINDIDC(Input 2) |
| 16.           end function |
| 17.        else |
| 18.           Exit |
| 19.        end if |
| 20.    end for |
| 21.    end function |

For the algorithm RACOCCT, the Power Grid Topology (PGT), the opted communication technologies (CT), the envisaged life-time of the smart grid (Y), the frequency of the chosen data packet (PA), the allowable latency of the chosen data packet (L), the bandwidth requirement of the chosen data packet (B), the probability of link unreliability (p) and the reliability constant (Rel) are given as inputs. Initially, the algorithm identifies the longest branch in the inputted PGT.

Then for the longest branch the function FINDIDC( ) runs the optimization model and finds the optimal communication technology combinations of intermediate devices. The function GETCOMMDET( ) gets the cost, bandwidth, communication range and latency details of each communication technology intended to use for the PGT. After returning the cost optimal $n_t$ for t=1; 2; :::k and optimal cost value, the function FINDIDC( ) populate the branches of the identified longest branch and calls the same function FINDIDC( ) recursively till it finds out the cost optimal $n_t$ for t=1; 2; :::k values for all branches of the longest branch and the for all sub-branches of each branch.

Once the radial PGT ends or all the branches are covered, the RACOCCT exit and ends the function.

RACOCCT offers a provision to designers to choose diverse communication technologies for varying branches and subbranches of the PGT. The probability of link unreliability and reliability constant can be selected depending upon the varying geographic features and propagation effects for different branches and sub-branches of the given PGT.

V. SIMULATION RESULTS AND DISCUSSIONS

Simulation of the optimization model defined by equations 1 to 8, yield the optimal combination of technologies at minimum cost for a specific data packet. This model gives the cost optimal combination of technologies for the longest distant branch of the power grid. Therefore, RACOCCT uses this model to recursively find the optimal combination of devices, for a given power grid topology.

A. Simulation Environment

Since the maximum pole to pole distance varies between 40 m and 50 m, a microgrid with equal distribution of poles and with a maximum of 40 m pole-to-pole distance was considered for the simulation. The maximum distance between a smart building or SCN and the MCS was assumed as 3 Kms. The length of Consumer Data Packet (CDP) generated by each smart building was set at as 10 kbps. For the simulation purpose, three technologies, namely ZigBee, Wi-Fi and Cellular were considered. Nevertheless, the model is capable of handling '1' to 'k' variations of technologies with different QoS metrics. For ZigBee technology the connectivity range is taken as 40 m, for Wi-Fi the connectivity range is taken as 120 m and for Cellular it is taken as 10 Km. The flow bandwidth for ZigBee is taken as 250 kbps, for Wi-Fi it is taken as 11 Mbps and for Cellular it is taken as 75 Mbps. The maximum latency allowed for CDP is one hour. In this discussion, Excel Solver was used to optimize the cost for the communication link with respect to the QoS metrics [29]. The solver took 50 iterations on an average for determining the optimal solutions for the model.

B. Simulation Parameters

The QoS metrics of communication architecture are bandwidth, delay, throughput, data rate, packet loss, and error rate. The variations of cost for transmitting each type of packet with the probability of link unreliability, the bandwidth consumes and the delay experience for the three communication technologies: ZigBee, Wi-Fi and Cellular are considered.

The bandwidth depends on the number of SCNs connected and latency depends on the maximum distance between source and destination. The probability of link error was varied up to 0.9. The number of SCNs in a microgrid was varied up to a maximum of 25. The maximum distance between a SCN and MCS was varied up to a maximum of 3 Km. For the simulation, it was assumed that CDP packet transmission with the infrastructure installation duration was 10 years. The installation cost for ZigBee, Wi-Fi and Cellular are chosen as 15 USD, 75 USD and 250 USD respectively.

C. Results and Discussions

Figure 21:
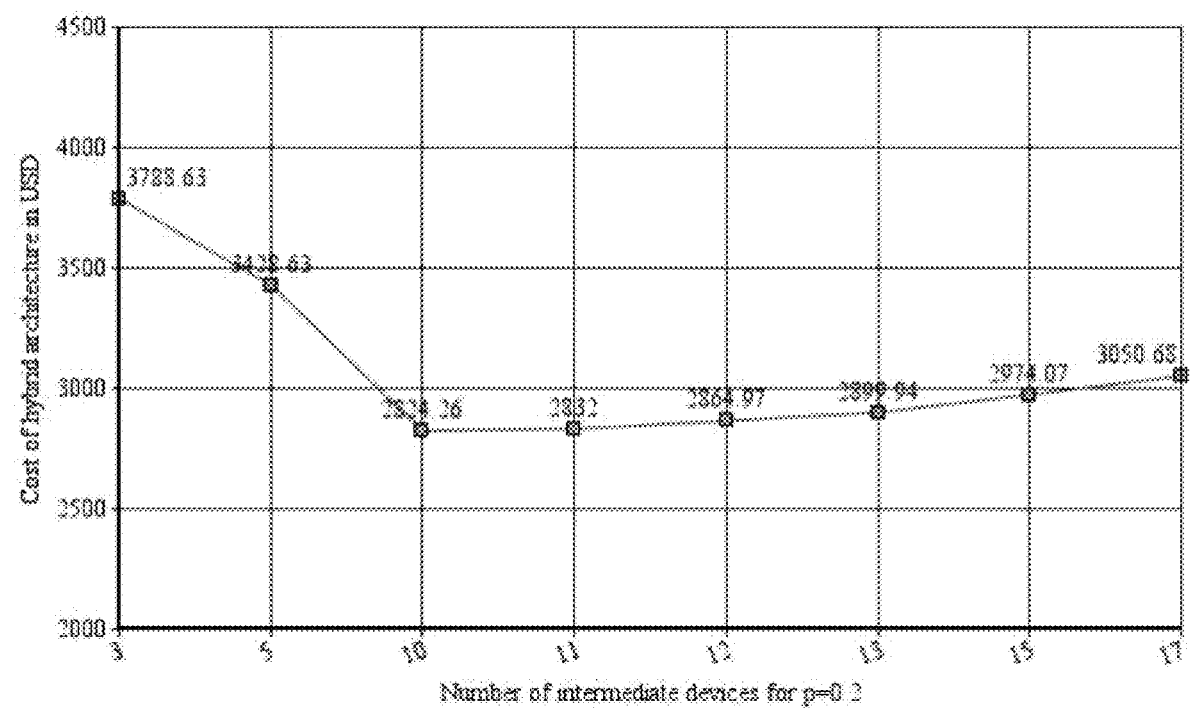
FIG. 21 is a graph relating number of intelligent devices to cost in an embodiment of the invention.
Figure 22:
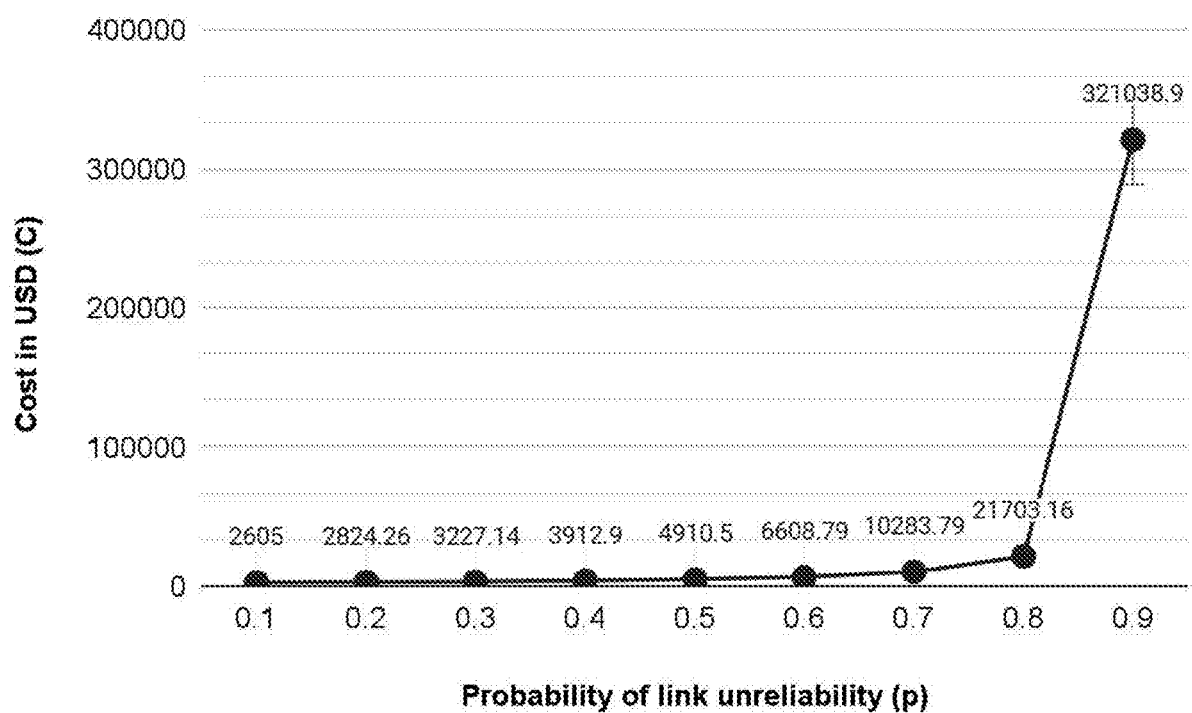
FIG. 22 is a graph relating cost to probability of link unreliability in an embodiment of the invention.
Figure 23:
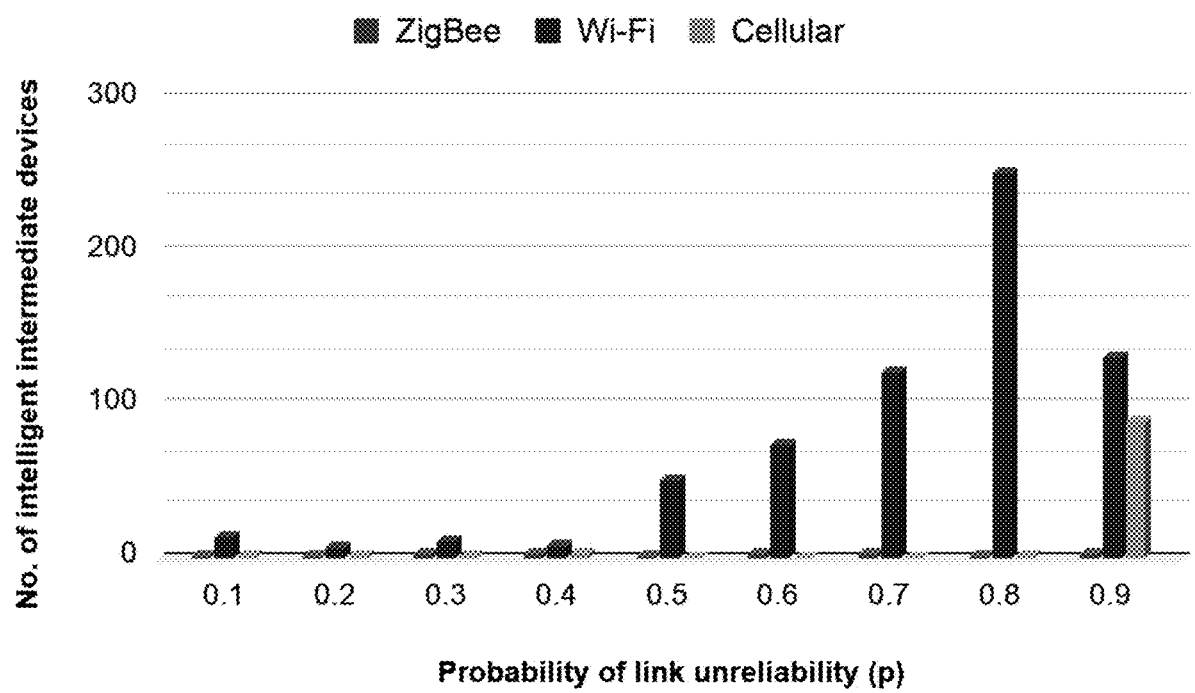
FIG. 23 is a graph relating number of intelligent intermediate devices to probability of unreliability in an embodiment of the invention.

The optimization model provides a cost increasing trend when the number of intermediate devices is very small and very large. The model tries to find an optimal number of combinations of intermediate devices within this trend. The simulation results in FIG. 21 show the variation of cost of the hybrid architecture in USD and the number of intermediate devices while keeping the probability of link unreliability p=0:2. The model gives the optimal value of cost as 2824 USD for 10 years when the number of intermediate devices is 10. Table II shows the technology combinations for different numbers of intermediate devices when p=0:2. The cost optimal technology combination is one ZigBee device, seven WiFi devices and two Cellular devices with all the constraints satisfied in the model. The simulation result in FIG. 22 illustrates the variation of cost with the probability of link unreliability for D=1 Km. The total cost is exponentially increasing after p=0:7 due to the fact that the model is trying to accommodate a greater number of devices for the successful packet transmission from source to destination. The plot in the FIG. 23 displays the optimal combination of technologies with the variation of probability of link unreliability respectively for D=1 Km. For all the range of probabilities of link unreliability, Wi-Fi technology is dominant. The reason for this may be the chosen lower cost of Wi-Fi technology compared to Cellular and reliable end-to-end data delivery compared to ZigBee. When p=0.9 the presence of Cellular technology is very well visible in the optimal combinations.

TABLE II

Technology combinations for varying number of intermediate devices for p = 0:2

| Number of intermediate devices | ZigBee | Wi-Fi | Cellular |
|---|---|---|---|
| 3 | 0 | 0 | 3 |
| 5 | 0 | 2 | 3 |
| 10 | 1 | 7 | 2 |
| 11 | 3 | 6 | 2 |
| 12 | 4 | 6 | 2 |
| 13 | 5 | 6 | 2 |
| 15 | 7 | 6 | 2 |
| 17 | 9 | 6 | 2 |

Figure 24:
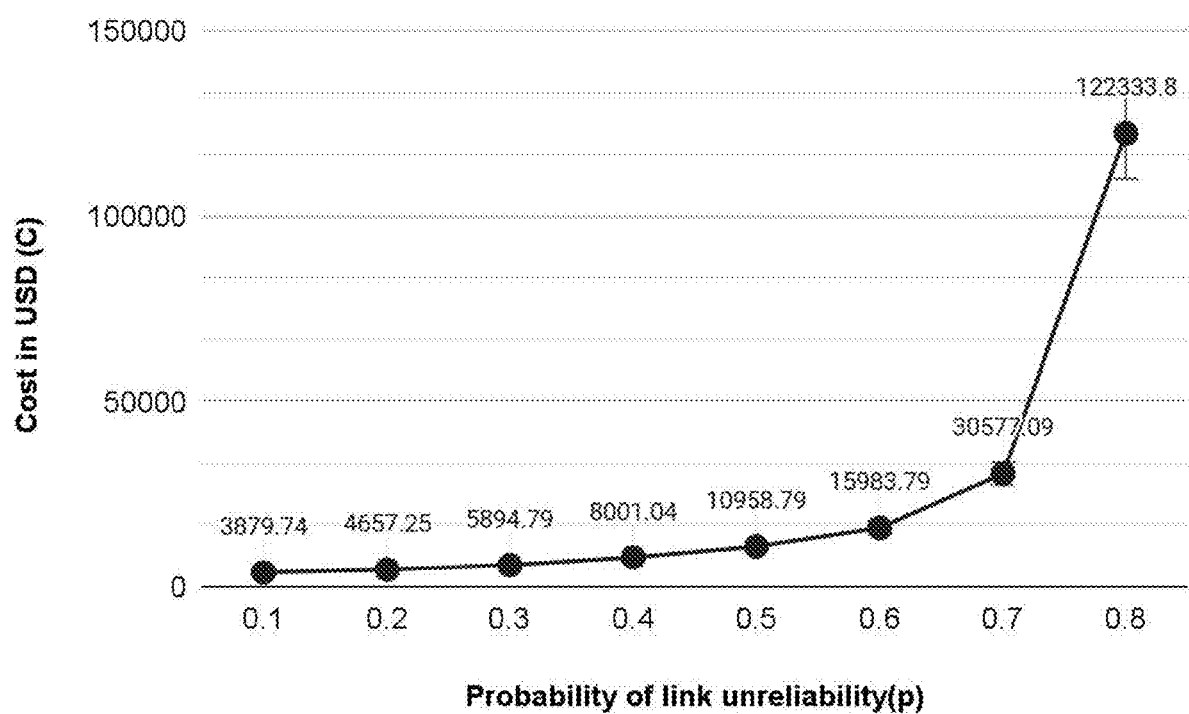
FIG. 24 is a graph relating cost to probability of unreliability in an embodiment of the invention.
Figure 25:
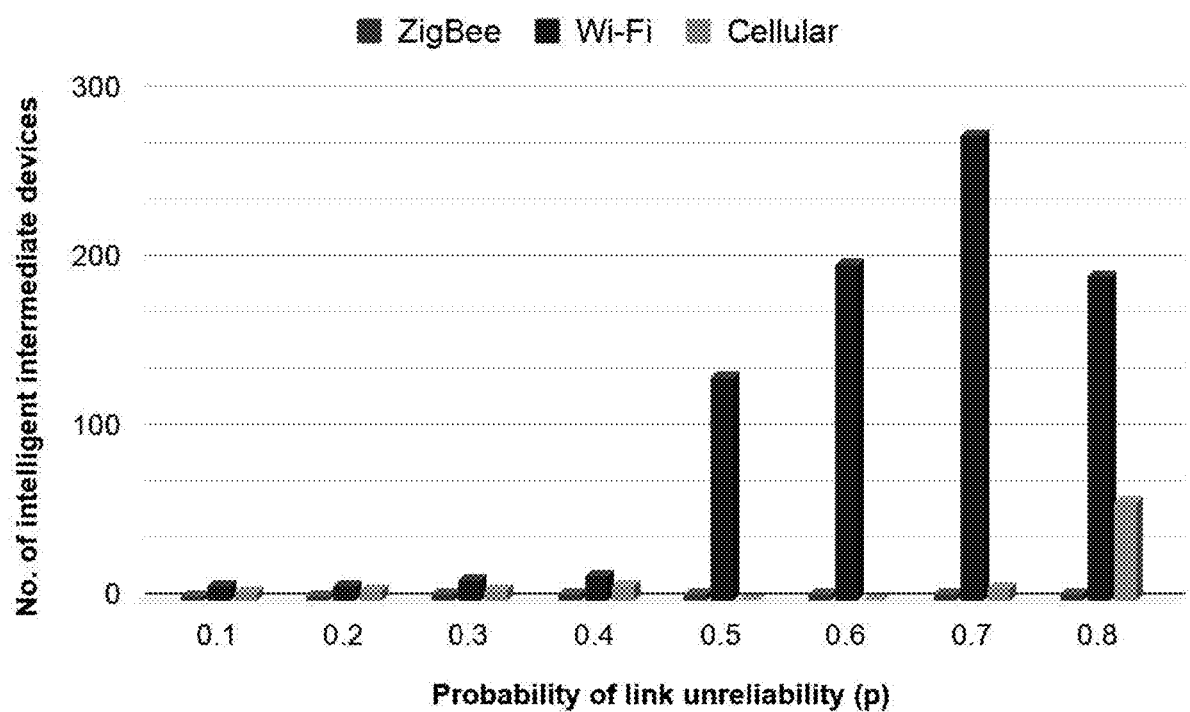
FIG. 25 is a graph relating number of intelligent intermediate devices to probability of unreliability in an embodiment of the invention.

The simulation results seen in FIGS. 24 and 25 display the variation of cost, with the probability of link unreliability and the cost optimal combination of technologies with the probability of link unreliability respectively for D=3 Kms. From p=0:5 onwards the total cost increases exponentially. When the distance between source to destination 'D' increases, the total cost for hybrid communication architecture also increases for the varying values of probability of link unreliability.

In FIG. 25, for the range of probabilities of link unreliability from p=0:1 to p=0:4, the model gives a balanced combination among the technologies. When p=0:5 onwards a sudden increase in Wi-Fi technology is visible. It is evident that the model picks the best technology suitable to lower the cost and at the same time to ensure the successful end-to-end packet transmission. Cellular makes a prominent presence when p=0:1 to p=0:4 and at p=0:9. At lower values of 'p', the choice of a fewer number of devices to cover more distance indicates the prominence of Cellular technology.

Figure 26:
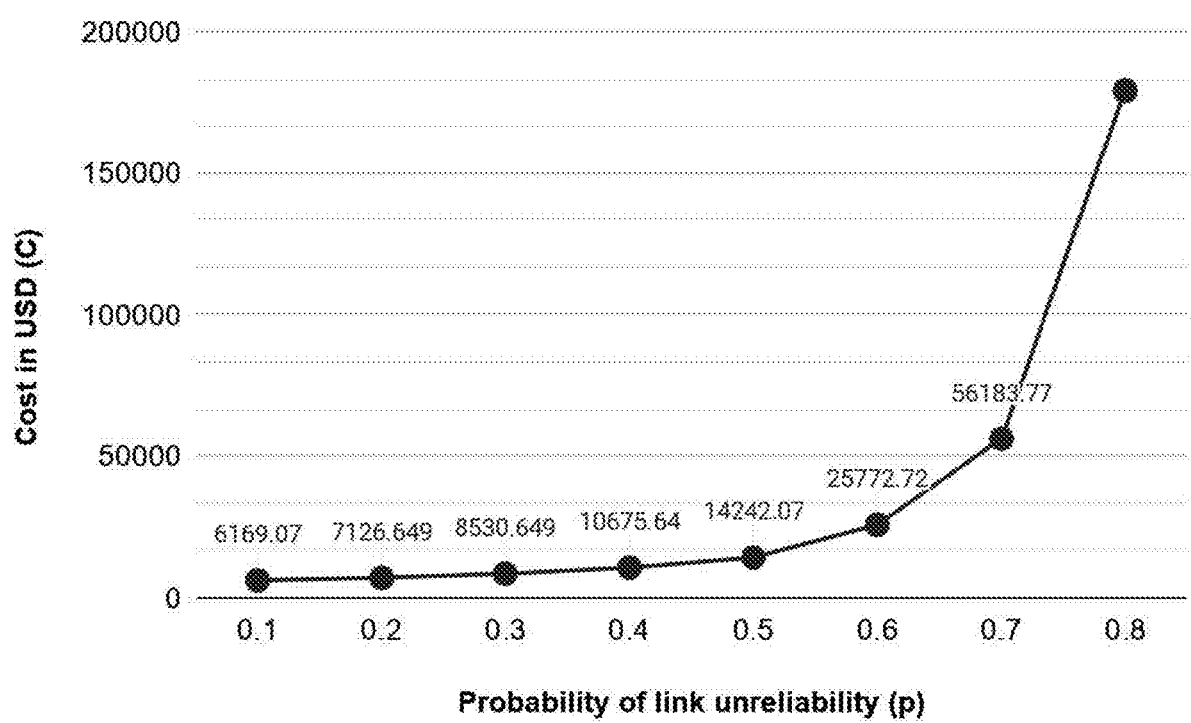
FIG. 26 is a graph relating cost to probability in another embodiment of the invention.
Figure 27:
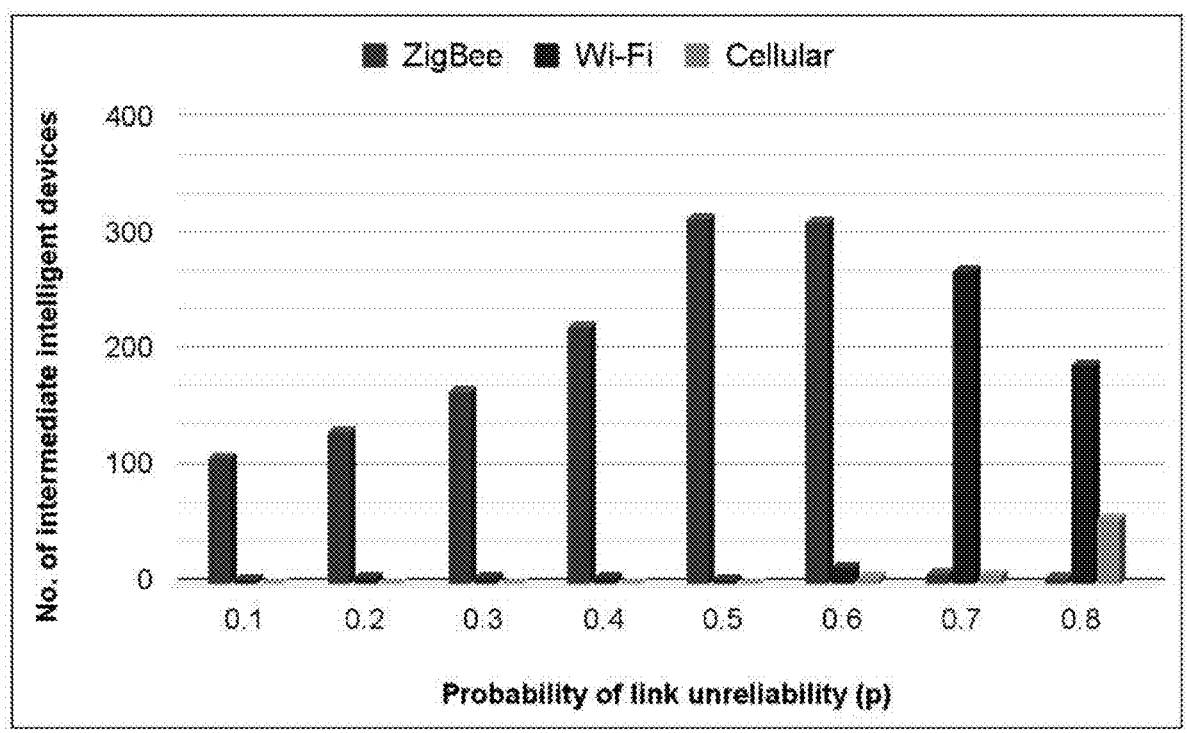
FIG. 27 is a graph relating number of intelligent intermediate devices to probability of unreliability in an embodiment of the invention.

To study the variation in the optimal combination of technologies with increased prices for Wi-Fi and Cellular devices, the simulation parameter installation cost 'Ic' for Wi-Fi and Cellular devices are escalated to 150 USD and 1000 USD respectively. The results are plotted in FIGS. 26 and 27. The cost versus probability of link unreliability is shown in FIG. 26 for D=3 Kms. The total cost increases exponentially from p=0:4 onwards. The difference in total cost with normal values and with increased price for Wi-Fi and Cellular, plotted in FIGS. 24 and 26 respectively also shows an exponential increase with respect to increase in 'p'. The change in the combination of devices with respect to variation in probability of link unreliability for D=3 Km with increased prices for Wi-Fi and Cellular is shown in FIG. 27.

Until the probability of link unreliability reaches 0.6, the model gives predominance to ZigBee since it is the cost-effective technology. The number of ZigBee devices increases exponentially till p=0:5. At p=0:6 the number of ZigBee devices is almost the same as that at p=0:5 and a small increase in the Wi-Fi and Cellular devices is noticeable in FIG. 27. After p=0:6, the dominance has shifted to Wi-Fi. At p=0:8, significant increase in Cellular devices is visible. Consequently, the model helps explain the cost optimal combinations of technologies for a radial distribution grid. The model gives an outline of the total cost for the optimal combinations for a specific probability of link unreliability 'p'. The probability of link unreliability can be derived from different path loss models for the geographical region where the deployment of devices are planning in the distribution grid.

D. Simulation Study and Results of RACOCCT

Figure 28:
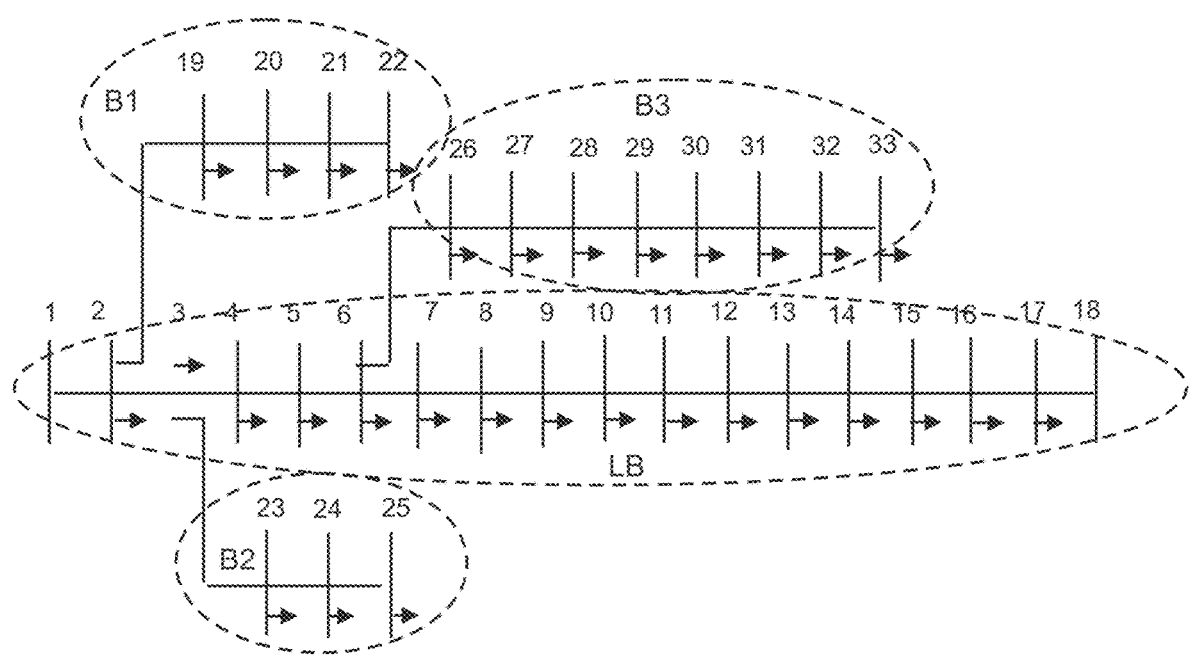
FIG. 28 is a diagram illustrating branches in different buses of a power grid.

Standard IEEE 33-bus radial distribution system has taken as an example power grid topology (PGT) to illustrate the simulation study of RACOCCT. As shown in FIG. 28, the longest branch (LB) has buses from 1 to 18, first branch B1 starts from bus 2 has buses from 19 to 22, second branch B2 starts from bus 3 has buses from 23 to 25 and finally the third branch B3 starts from bus 6 has buses from 26 to 33.

The algorithm RACOCCT is implemented in Java and the code calls the Excel solver to solve the optimization formulations. For the simulation study of RACOCCT, we have considered the consumer data packet (CDP) transmission from source to destination with transmission frequency of one minute and with latency constraint of one second. The infrastructure installation duration for all the branches is taken as 10 years. We have varied some of the input parameters among the branches in PGT which is shown in table III.

TABLE III

Input parameters for each branch of PGT

| Branch ID | p | Source Bus Number | Destination Bus Number | D in Km |
|---|---|---|---|---|
| LB | 0.3 | 1 | 18 | 12 |
| B1 | 0.7 | 19 | 22 | 3 |
| B2 | 0.4 | 23 | 25 | 2.5 |
| B3 | 0.6 | 26 | 33 | 5 |

ZigBee, WiFi and Cellular communication technologies are selected for all branches of PGT. The algorithm RACOCCT first choose the longest branch in PGT which is LB for finding out the optimal combination of communication technologies for intermediate devices. Thereafter branches B1, B2 and B3 are successively picked out for recursively determining the optimal combination of intermediate devices. The result of RACOCCT for the given PGT and the input parameters are shown in table IV.

TABLE IV

Output of RACOCCT with given input parameters

| Branch ID | No. of ZigBee devices | No. of WiFi devices | No. of Cellular devices | Cost in USD |
|---|---|---|---|---|
| LB | 628 | 6 | 0 | 26509.64 |
| B1 | 10 | 271 | 7 | 56183.76 |
| B2 | 189 | 6 | 0 | 9388.64 |
| B3 | 305 | 12 | 19 | 48447.67 |

For the branches LB and B2, the model opt out the Cellular technology while the number of ZigBee devices are more compared to the number of WiFi devices. The reason for the increased ZigBee devices in the cost optimal combination can be the values inputted for probability of link unreliability is less than 0.5 in both the cases. We can see the inclusion of Cellular devices for the branches B1 and B3. The infrastructural cost is highest in case of the branch B1, due to the fact that the probability of link unreliability is highest for the branch B1 compared to other branches even though the source to destination distance is comparatively short. The infrastructural cost is comparatively low in case of the branch LB even though it is the longest branch which is due to the lowest value of the probability of link unreliability. Thus RACOCCT can yield the cost optimal combination of communication technologies for intermediate devices for a given power grid topology.

VI. CONCLUSION

In this teaching, an overview of smart distribution architecture with networked microgrids and the need of hybrid communication network for the data exchange inside the microgrid is presented. Since instrumenting the entire grid with intelligent communication devices is too expensive, an optimization model is formulated which gives the cost optimal combination of intermediate intelligent devices from a source to destination inside the microgrid. The QoS metrics such as data packet latency, bandwidth requirement, link reliability, packet drops, and communication range of the technology were taken into account in the formulation for derivation of the cost optimal solution. The proposed algorithm, the Recursive Algorithm for Cost Optimal Combination of Communication Technology (RACOCCT) yields the cost optimal solution recursively for a given power grid topology. The model has been simulated in Solver and evaluated the results with ZigBee, Wi-Fi and Cellular technologies. The results of the simulation study illustrated the cost optimal combination of technologies for varying probability of link unreliability using the communication technologies such as ZigBee, Wi-Fi and Cellular. The proposed cost optimal model only gave the cost optimal combination of technologies for the longest distant branch of the power grid. RACOCCT can recursively find the optimal combination of devices for the entire smart distribution grid. The results of the simulation study of RACOCCT demonstrated its capability to derive the cost optimal combination of intermediate devices for a given power grid topology.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A method for implementing a micro grid within a Smart Distribution Power Grid (SDPG), comprising:
   placing smart meters enabled to sense current and current direction at consumer sites in the SDPG, the smart meters enabled to communicate wirelessly from individual ones of consumer sites within an area of the micro grid to Smart Distribution Nodes (SDNs);
   determining a set of SDNs of a number, placement and data packet transfer technology to transfer data from the smart meters to a Micro Grid Controlling Station (MCS), the set determined in a manner to provide cost optimization, where cost is determined form at least original node costs, data packet hops, operating costs and maintenance costs; and
   implementing the set of SDNs along a power grid topology (PGT) of the micro grid, such that data is transmitted from each of the smart meters to a proximate SDN and through other SDNs to the MCS.

2. The method of claim 1, wherein the determination is made using an algorithm that considers the PGT, a given life-time of the smart grid (Y), frequency of the data packet (Pf), allowable latency of the data packet (L), a bandwidth requirement of a data packet (B) as one input and accepts Communication Technologies ($CT_t$), t=1, 2, 3 . . . k, a probability of link unreliability (p) and a reliability constant (Rel) as another input.

3. The method of claim 2, wherein the algorithm initially assumes a longest branch (LB) of the given PGT.

4. The method in claim 2 wherein the algorithm assumes installation cost, maintenance cost, communication cost, and flow bandwidth.

5. The method of claim 2 wherein the algorithm runs a cost optimal model for configuring a distribution grid with smart communication devices wherein the algorithm minimizes a hybrid communication infrastructure cost (C) for the distribution grid according to:

$$C = \sum_{t=1}^{k} \left[ n_t \times (I_c(t) + (\delta_t \times Y \times 12) + (C_t \times Y \times P_f \times (N_r + 1))) + Y \times (C_t(t))^{(nscn+n_t)} \right]$$ (1)

$$\text{subject to:} \sum_{t=1}^{k} \left[ n_t - 1 \right] \times r_1 \times (1-p)^2 \geq D$$ (2)

$$N_r + 1 \geq 1/(1-p)$$ (3)

$$\sum_{t=1}^{k} [N_r + 1 \times (L_{link} + t + r) \times n_t] \leq L$$ (4)

$$\sum_{t=1}^{k} [n_t - 1) \times p] \leq Rel$$ (5)

$$n_t \geq 0$$ (6)

$$0 \leq p < 1$$ (7)

$$\text{Max}(b_{link}) \leq \text{Min}(B_t)$$ (8)

wherein:
$\delta_t$ is Maintenance cost for an intelligent device
$C_t$ is Cost of communication for a technology
$N_r$ is Number of re-transmissions
$I_c$ is Installation cost of an intelligent device
$l_{link}$ is Data latency experienced in the link
t is Delay for transmitting a packet from an intelligent device
r is Delay for receiving the packet from an intelligent device
$r_t$ is Communication range based on the technology
Y is Number of years
$P_f$ is Frequency of packet transmission
$n_t$ is Number of intelligent devices with technology 't'
$C_i(t)$ is Cost of information capacity requirement for technology 't'
$n_{SCN}$ is Number of smart buildings in microgrid
p is Probability of communication link unreliability
$b_{link}$ is Flow bandwidth for the data packet
$B_t$ is Maximum flow bandwidth of the technology
L is Latency allowed for the data packet to reach its end destination; and
Rel is Reliability factor.

6. The method of claim 2, wherein the algorithm returns an optimal number of SDNs with given communication technology combinations and an optimal cost for a hybrid communication network infrastructure.

7. The method of claim 5 wherein the algorithm executes the cost optimal model determining an optimal hybrid communication infrastructure cost and an exact quantity of the communication technologies with minimal cost subject to Quality of Service (QOS) parameters of each of the communication technologies and QoS requirement of a data packet generated by a Smart Consumer Node (SCN) at a smart building in the distribution grid.

8. The method of claim 5 wherein the cost optimal model assumes ZigBee, Wi-Fi and Cellular as the communication technologies in the running of the cost optimal model.

9. The method of claim 7 wherein the QOS parameters considered for each of the communication technologies include data packet latency, bandwidth requirement, link reliability, packet drops and communication range of the technology, for derivation of the cost optimal solution.

10. The method of claim 2 wherein the algorithm assumes a PGT with four branches including a longest branch (LB) and assumes ZigBee, Wi-Fi and Cellular as the communication technologies.

* * * * *